(12) United States Patent
Kihara et al.

(10) Patent No.: US 12,474,579 B2
(45) Date of Patent: Nov. 18, 2025

(54) IMAGE DISPLAY APPARATUS AND DISPLAY APPARATUS

(71) Applicant: SONY GROUP CORPORATION, Tokyo (JP)

(72) Inventors: Nobuhiro Kihara, Tokyo (JP); Katsuyuki Akutsu, Tokyo (JP); Daisuke Ueda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 815 days.

(21) Appl. No.: 17/596,505

(22) PCT Filed: Apr. 24, 2020

(86) PCT No.: PCT/JP2020/017715
§ 371 (c)(1),
(2) Date: Dec. 10, 2021

(87) PCT Pub. No.: WO2020/255562
PCT Pub. Date: Dec. 24, 2020

(65) Prior Publication Data
US 2022/0236567 A1    Jul. 28, 2022

(30) Foreign Application Priority Data

Jun. 18, 2019  (JP) .................................. 2019-112724

(51) Int. Cl.
*G02B 27/01* (2006.01)
*G02B 26/08* (2006.01)
*G02B 26/10* (2006.01)

(52) U.S. Cl.
CPC ..... *G02B 27/0172* (2013.01); *G02B 26/0816* (2013.01); *G02B 26/101* (2013.01);
(Continued)

(58) Field of Classification Search
CPC ............ G02B 27/0172; G02B 26/0816; G02B 26/101; G02B 27/0176; G02B 27/0179; G02B 2027/0187
See application file for complete search history.

(56) References Cited

U.S. PATENT DOCUMENTS

2014/0375540 A1    12/2014   Ackerman et al.
2018/0373041 A1*   12/2018   Sugawara .............. G02B 26/10
(Continued)

FOREIGN PATENT DOCUMENTS

CA      2388015 A1    5/2001
CN    102289073 A    12/2011
(Continued)

OTHER PUBLICATIONS

International Search Report and Written Opinion of PCT Application No. PCT/JP2020/017715, issued on Aug. 4, 2020, 10 pages of ISRWO.

(Continued)

*Primary Examiner* — Joseph P Martinez
(74) *Attorney, Agent, or Firm* — CHIP LAW GROUP

(57) ABSTRACT

There is provided an image display apparatus that includes an image forming apparatus, an optical element arranged in front of a face of an observer, and a movement control apparatus. When a region situated on the side of the ear of the observer, as viewed from the optical element, is referred to as a region situated behind the optical element, the image forming apparatus is in the region situated behind the optical element. An image exiting the image forming apparatus obliquely enters the optical element from the region situated behind the optical element, and is reflected off the optical element to reach the pupil of the observer. When there is a change in the position of the pupil of the observer, the optical element is moved using the movement control apparatus, and the position of the image exiting the image forming apparatus is controlled using the movement control apparatus.

20 Claims, 21 Drawing Sheets

(52) U.S. Cl.
CPC ............... *G02B 2027/0174* (2013.01); *G02B 2027/0178* (2013.01)

(56) References Cited

U.S. PATENT DOCUMENTS

2019/0155337 A1    5/2019   Ohkawa et al.
2020/0033603 A1*   1/2020   Ohkawa ............ G02B 27/0103

FOREIGN PATENT DOCUMENTS

| | | | |
|---|---|---|---|
| CN | 105452936 A | | 3/2016 |
| CN | 110506232 A | | 11/2019 |
| EP | 1230575 B1 | * | 10/1999 ............ G02B 27/01 |
| EP | 1230575 A1 | | 8/2002 |
| EP | 3014337 A1 | | 5/2016 |
| JP | 2003-513333 A | | 4/2003 |
| JP | 2009-294605 A | | 12/2009 |
| KR | 10-0703930 B1 | | 4/2007 |
| KR | 10-2016-0022924 A | | 3/2016 |
| KR | 10-2019-0139862 A | | 12/2019 |
| WO | 2000/060605 A1 | | 10/2000 |
| WO | 2001/033282 A1 | | 5/2001 |
| WO | 2014/209706 A1 | | 12/2014 |
| WO | WO-2017033601 A1 | | 3/2017 |
| WO | 2018/190007 A1 | | 10/2018 |

OTHER PUBLICATIONS

Extended European Search Report of EP Application No. 20827398.7 issued on Jul. 15, 2022, 09 pages.

* cited by examiner

Movement of image forming apparatus in direction corresponding to horizontal direction

IMAGE DISPLAY APPARATUS AND DISPLAY APPARATUS

CROSS REFERENCE TO RELATED APPLICATIONS

This application is a U.S. National Phase of International Patent Application No. PCT/JP2020/017715 filed on Apr. 24, 2020, which claims priority benefit of Japanese Patent Application No. JP 2019-112724 filed in the Japan Patent Office on Jun. 18, 2019. Each of the above-referenced applications is hereby incorporated herein by reference in its entirety.

TECHNICAL FIELD

The present disclosure relates to an image display apparatus and a display apparatus, and in particular to a display apparatus that can be used as, for example, a head-mounted display (HMD), and an image display apparatus that is suitable for use in the display apparatus.

BACKGROUND ART

A Maxwellian viewing retinal projection display that displays thereon an image by the image (a pencil of light) being directly projected onto the retina of an observer, that is, a Maxwellian viewing retinal projection head-mounted display (hereinafter abbreviated as a "retinal projection HMD" in some cases) in particular is well known. Here, there is a need to align the light convergence with the pupil in the use of such a retinal projection HMD. However, the diameter of a human pupil is in a very narrow range of between 2 mm in a bright environment and 7 mm in a dark environment. Thus, when the retinal projection HMD fails to follow the movement of an eyeball (primarily, the rotation of an eyeball), an image (a pencil of light) deviates from the pupil of an observer. This results in being unable to continuously observe the image properly.

A technology used to move an ocular optical system in a retinal projection HMD is known, the technology being disclosed in, for example, Japanese Patent Laid-Open No. 2009-294605. Specifically, as illustrated in, for example, FIGS. 3A and 3B, a scanning display apparatus disclosed in Japanese Patent Laid-Open No. 2009-294605 includes
  a light source 101,
  a scanning unit 104 that scans a pencil of light from the light source 101,
  a scanning optical system 105 that collects the pencil of light from the scanning unit 104, and
  an ocular optical system 106 that guides the pencil of light from the scanning optical system 105 to an exit pupil with which the eye of an observer is aligned,
  the pencil of light that travels from the scanning optical system 105 to the ocular optical system 106 being telecentric,
  the ocular optical system 106 including a first reflecting surface 106c off which the pencil of light from the scanning optical system 105 is reflected to be directed to the exit pupil,
  the scanning display apparatus including a first mechanism 110 that enables the ocular optical system 106 to move with respect to the scanning optical system 105 and the scanning unit 104 in parallel with a direction in which the pencil of light travels from the scanning optical system 105 to the ocular optical system 106.

Further, in addition to being horizontally moved, the exit pupil 107 can also be vertically moved using the optical system illustrated in FIG. 10 of Japanese Patent Application Laid-Open No. 2009-294605.

In the scanning display apparatus disclosed in Japanese Patent Application Laid-Open No. 2009-294605, a primary portion of the scanning optical system 105 and the first reflecting surface 106c are arranged in an imaginary plane (an x axis represents the horizontal direction and a y axis represents the vertical direction) that is orthogonal to a pupillary axis of an observer (that is represented by a z axis). Further, the first reflecting surface 106c bends the pencil of light from the scanning optical system 105 ninety degrees and causes the pencil of light to enter the eye of the observer. The first reflecting surface 106c moves in an xy plane. Further, according to the movement of the first reflecting surface 106c, a light-collecting optical system 102 that is a movable optical system is moved in its optical-axis direction to move the position of an image point for the pencil of light from the light source unit 101.

CITATION LIST

Patent Literature

Patent Literature 1: Japanese Patent Application Laid-open No. 2009-294605

DISCLOSURE OF INVENTION

Technical Problem

Note that, in the scanning display apparatus disclosed in Japanese Patent Application Laid-Open No. 2009-294605 described above, the first reflecting surface 106c bends the pencil of light from the scanning optical system 105 ninety degrees and causes the pencil of light to enter the eye of an observer. Thus, there is an increase in the thickness of the ocular optical system 106 when the first reflecting surface 106c is orthogonally projected onto an xz plane. This results in difficulty in making the ocular optical system 106 smaller. Such difficulty in making the ocular optical system 106 smaller is a great obstacle to the practical use of a head-mounted display including a design of the head-mounted display. Further, it is difficult to make the first reflecting surface 106c that is a movable portion smaller. Thus, in reality, it is difficult to cause the first reflecting surface 106c to follow the high-speed movement of an eyeball, and it is also difficult to reduce power consumption for moving the ocular optical system 106.

Thus, it is an object of the present disclosure to provide an image display apparatus that can be made smaller and lighter, and an image display apparatus that is suitable for use in the display apparatus.

Solution to Problem

In order to achieve the object described above, an image display apparatus according to a first aspect or a second aspect of the present disclosure includes
  an image forming apparatus,
  an optical element that is arranged in front of a face of an observer, and
  a movement control apparatus, in which
  when a region situated on a side of an ear of the observer, as viewed from the optical element, is referred to as a region situated behind the optical element, the image forming apparatus is arranged in the region situated behind the optical element, and an image exiting the image forming apparatus obliquely enters the optical element from the region situated behind the optical element, and is reflected off the optical element to reach a pupil of the observer.

Further, in the image display apparatus according to the first aspect of the present disclosure, when there is a change in a position of the pupil of the observer, the optical element is moved using the movement control apparatus, and a position of the image exiting the image forming apparatus is controlled using the movement control apparatus. Furthermore, in the image display apparatus according to the second aspect of the present disclosure, when there is a change in a position of the pupil of the observer, the image forming apparatus is moved using the movement control apparatus.

In order to achieve the object described above, a display apparatus of the present disclosure includes a frame that is worn by an observer, and an image display apparatus that is attached to the frame, the image display apparatus being the image display apparatus according to the first aspect of the present disclosure, or the image display apparatus according to the second aspect of the present disclosure, or a combination of the image display apparatus according to the first aspect of the present disclosure and the image display apparatus according to the second aspect of the present disclosure.

MODE(S) FOR CARRYING OUT THE INVENTION

Figure 1:
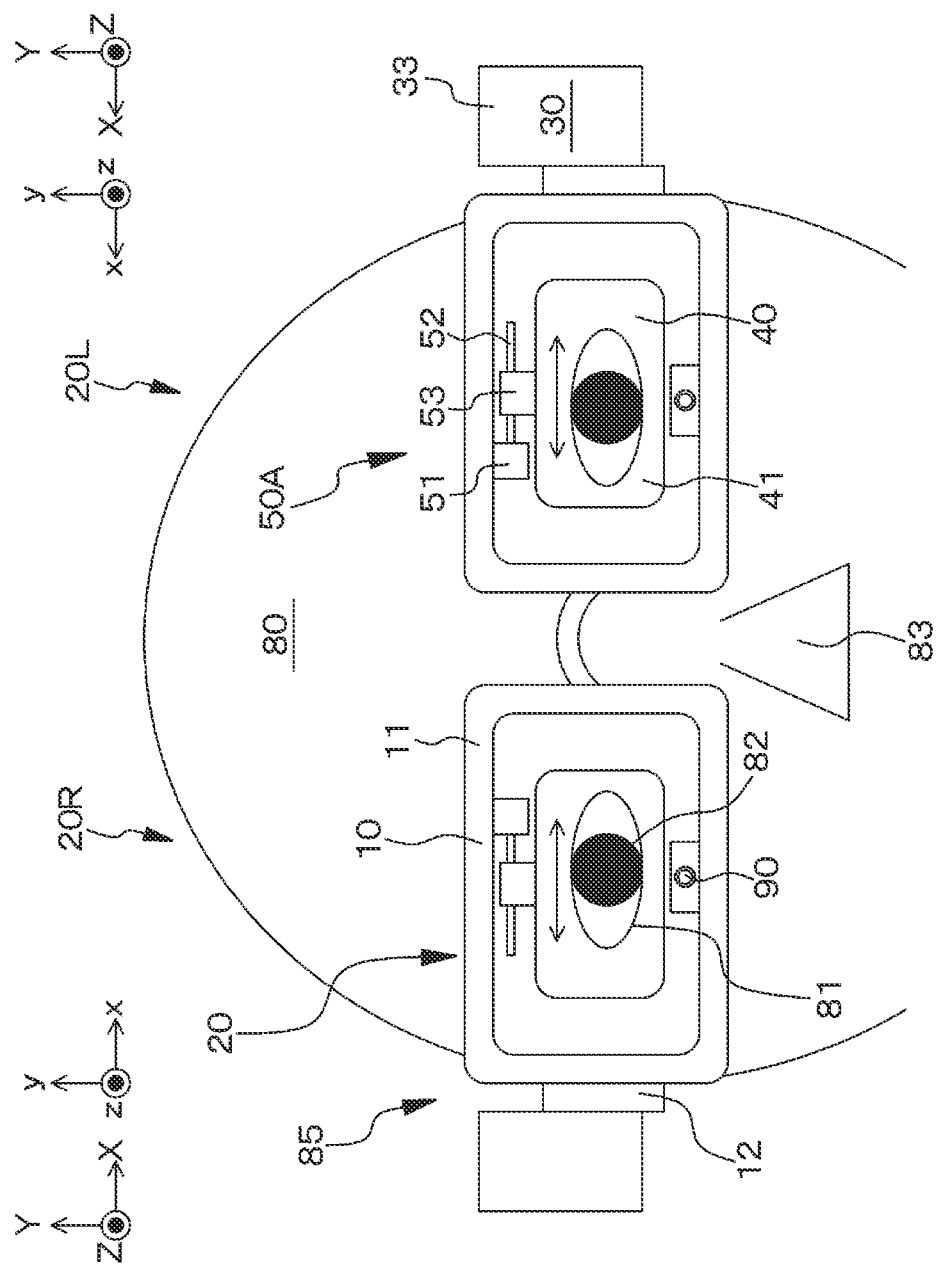
FIG. 1 schematically illustrates a display apparatus of a first embodiment, as viewed from the front.

The present disclosure is described below on the basis of embodiments with reference to the drawings. However, the present disclosure is not limited to the embodiments, and various numerical values and materials in the embodiments are merely illustrative. Note that the description is made in the following order.

1. General Descriptions of Image Display Apparatuses According to First and Second Aspects of Present Disclosure, and Display Apparatus of Present Disclosure
2. First Embodiment (Image Display Apparatus According to First Aspect of Present Disclosure, and Display Apparatus of Present Disclosure)
3. Second Embodiment (Modification of First Embodiment)
4. Third Embodiment (Image Display Apparatus According to Second Aspect of Present Disclosure, and Display Apparatus of Present Disclosure)
5. Fourth Embodiment (Modification of Third Embodiment)
6. Fifth Embodiment (Combination of First and Fourth Embodiments)
7. Sixth Embodiment (Modification of Fifth Embodiment)
8. Seventh Embodiment (Modification of Sixth Embodiment)
9. Eighth Embodiment (Another Modification of Sixth Embodiment)
10. Ninth Embodiment (Modification of First to Eighth Embodiments)
11. Others <General Descriptions of Image Display Apparatuses According to First and Second Aspects of Present Disclosure, and Display Apparatus of Present Disclosure>

In an image display apparatus according to a first aspect of the present disclosure, or the image display apparatus according to the first aspect of the present disclosure, which is included in a display apparatus of the present disclosure (they may be hereinafter collectively referred to as an "image display apparatus or the like according to the first aspect of the present disclosure"), an optical element may be moved, using a movement control apparatus, in a direction corresponding to a change in the position of the pupil of an observer in parallel with a horizontal direction. Note that, for convenience, such a movement of an optical element may be referred to as a "horizontal movement of an optical element".

Further, in the image display apparatus or the like according to the first aspect of the present disclosure including such a favorable configuration, an image forming apparatus may be moved, using the movement control apparatus, in a direction corresponding to a change in the position of the pupil of the observer in parallel with a vertical direction. Note that, for convenience, such a movement of a movement control apparatus may be referred to as a "vertical movement of a movement control apparatus". Further, in this case, the image forming apparatus may include a 4f optical system through which an image exiting the image forming apparatus passes, and the 4f optical system may be moved, using the movement control apparatus, in the direction corresponding to the change in the position of the pupil of the observer in parallel with the vertical direction.

Further, the image forming apparatus may include a reflecting mirror off which the image exiting the image forming apparatus is reflected, and a light reflection angle of the reflecting mirror may be changed using the movement control apparatus.

Further, in the image display apparatus or the like according to the first aspect of the present disclosure including the favorable configuration described above, the optical element may be moved, using the movement control apparatus, in the direction corresponding to the change in the position of the pupil of the observer in parallel with the vertical direction. Note that, for convenience, such a movement of an optical element may be referred to as a "vertical movement of an optical element".

Here, primarily due to the rotation of an eyeball of the observer, the position of the pupil is horizontally or vertically changed, or is horizontally and vertically changed.

In the image display apparatus or the like according to the first aspect of the present disclosure including the favorable configurations described above, the optical element may include a reflective hologram diffraction grating. In this case, the reflective hologram diffraction grating may include a light-collecting function. In other words, the reflective hologram diffraction grating may include a function as a concave mirror. Further, the optical element may include the concave mirror. Furthermore, in the favorable configurations described above, a pencil of light exiting the image forming apparatus may enter the optical element in a telecentric state. This makes it possible to reduce various aberrations, and to prevent the size of an image from being changed due to the movement of the optical element. Further, in the image display apparatus or the like according to the first aspect of the present disclosure including the favorable configurations described above, the optical element may include a lens that has a positive optical power, and a flat reflecting mirror, the lens being a lens through which an image exiting the image forming apparatus passes.

Further, in the image display apparatus or the like according to the first aspect of the present disclosure, the optical element may be rotated, using the movement control apparatus, according to a change in the position of the pupil of the observer in parallel with the vertical direction. Further, in the image display apparatus or the like according to the first aspect of the present disclosure, an angle of arrangement of the optical element may also be changed, using the movement control apparatus, according to a change in the position of the pupil of the observer in parallel with the vertical direction. Note that, in these cases, it is sufficient if the optical element is horizontally moved using the movement control apparatus when there is a change in the position of the pupil of the observer in parallel with the horizontal direction.

In an image display apparatus according to a second aspect of the present disclosure, or the image display apparatus according to the second aspect of the present disclosure, which is included in the display apparatus of the present disclosure (they may be hereinafter collectively referred to as an "image display apparatus or the like according to the second aspect of the present disclosure"), an optical element may include a reflective hologram diffraction grating. In this case, the reflective hologram diffraction grating may include a light-collecting function. Further, a pencil of light exiting the image forming apparatus may enter the optical element in a telecentric state. This makes it possible to reduce various aberrations, and to prevent the size of an image from being changed due to the movement of the optical element.

Further, in the image display apparatuses or the like according to the first and second aspects of the present disclosure including the favorable configurations described above, the image forming apparatus may include a dispersion compensation element.

The display apparatus of the present disclosure including the favorable configurations described above may include the image display apparatus for a right eye and the image display apparatus for a left eye.

Further, the display apparatus of the present disclosure including the various favorable configurations described above may be worn on the head of the observer. In other words, the display apparatus of the present disclosure may be a head-mounted display (HMD), that is, a Maxwellian viewing retinal projection HMD in particular.

The movement control apparatus includes a drive mechanism, and, in some cases, the movement control apparatus further includes a position control circuit that controls the position of an image exiting the image forming apparatus. The drive mechanism includes, for example, a drive apparatus and a slide bar. The position of an image exiting the image forming apparatus is controlled using the movement control apparatus. Specifically, for example, it is sufficient if the position of an image exiting the image forming apparatus (that is, the position of an image formed by the image forming apparatus or a region of an image exiting a scanning mechanism described later) is moved on the basis of a control signal from the position control circuit included in the movement control apparatus. When the display apparatus includes the image display apparatus for a right eye and the image display apparatus for a left eye, an amount of movement of the position of an image exiting the image forming apparatus, and an amount of a change in a region onto which the image exiting the image forming apparatus is projected depend on, for example, an amount of parallax, or the depth of a three-dimensional stereoscopic image to be displayed.

The reflective hologram diffraction grating may have a well-known configuration and structure. The image display apparatus can be a semi-transmissive (see-through) image display apparatus by using a hologram diffraction grating, and this makes it possible to see outside through the optical element. When the optical element includes a concave mirror, a flat reflecting mirror, or a Fresnel reflecting mirror, the concave mirror, the flat reflecting mirror, or the Fresnel reflecting mirror can be obtained by a light reflective film off which light of a specific wavelength is reflected being formed on a light reflective surface of a transparent member (that may be referred to as a "base portion" for convenience) that is included in the concave mirror, the flat reflecting mirror, or the Fresnel reflecting mirror. This makes it possible to see outside through the concave mirror, the flat reflecting mirror, or the Fresnel reflecting mirror.

Figure 21:
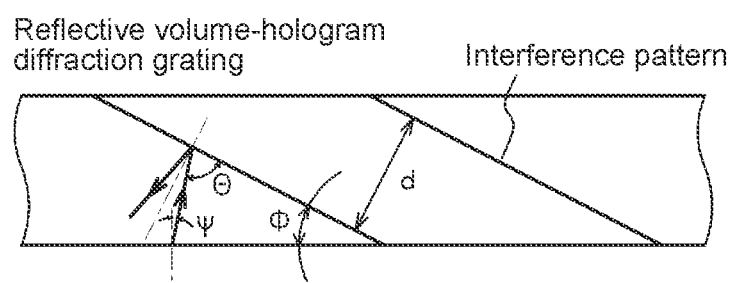
FIG. 21 is a schematic cross-sectional view illustrating an enlarged portion of a hologram diffraction grating.

FIG. 21 is a schematic cross-sectional view illustrating an enlarged portion of a hologram diffraction grating, where an interference pattern that has an angle of inclination (a slant angle) $\varphi$ is formed in the hologram diffraction grating. The angle of inclination $\varphi$ refers to an angle formed by an interference pattern and the surface of a hologram diffraction grating. The interference pattern is formed from the interior of the hologram diffraction grating to the surface of the hologram diffraction grating. The interference pattern satisfies the Bragg condition. The Bragg condition refers to a condition that satisfies Formula (A) indicated below. In Formula (A), m is a positive integer, $\lambda$ is a wavelength, d is a pitch of a grating plane (spacing of an imaginary plane including an interference pattern in a normal direction), and $\Theta$ is a complement of an angle at which light enters an interference pattern. Further, when light enters a hologram diffraction grating at an angle of incidence $\psi$, a relationship between $\Theta$, the angle of inclination $\varphi$, and the angle of incidence $\psi$ is represented by Formula (B) indicated below.

$$m \cdot \lambda = 2 \cdot d \cdot \sin(\Theta) \quad (A)$$

$$\Theta = 90° - (\varphi + \psi) \quad (B)$$

The optimization of the angle of inclination (the slant angle) $\varphi$ and the pitch (d) makes it possible to provide a light-collecting function to the hologram diffraction grating. Examples of a material of the hologram diffraction grating include a photopolymer material. It is sufficient if the material and a basic structure of the hologram diffraction grating are similar to a material and a structure of a conventional hologram diffraction grating. An interference pattern is formed from the interior of the hologram diffraction grating to the surface of the hologram diffraction grating, and it is sufficient if a method for forming such an interference pattern itself is similar to a conventional formation method.

The optical element may be attached to a base material, or the optical element may be formed on the surface of the base material. Examples of a material of the base material or the base portion include a plastic material or glass. Specifically, when the base material or the base portion is made of a transparent plastic material, examples of the transparent plastic material include polyethylene terephthalate, polyethylene naphthalate, polycarbonate, cellulose esters such as cellulose acetate, fluorine polymers such as a copolymer of polyvinylidene fluoride or polytetrafluoroethylene and hexafluoropropylene, polyether such as polyoxymethylene, polyacetal, polystyrene, polyethylene, polypropylene, poly- olefins such as a metylpentene polymer, polyimide such as polyamide-imide or polyetherimide, polyamide, polyethersulfone, polyphenylene sulfide, polyvinylidene fluoride, tetraacetylcellulose, brominated phenoxy, polyarylate, and polysulfone. When the base material or the base portion is made of glass, examples of the glass include transparent glass such as soda-lime glass and a plate of white glass. A hard coat layer that includes an organic-inorganic mixture layer, or an antireflective film made of a fluororesin may be formed on an outer surface of the base material or the base portion. The base material is attached to a front portion that is included in a frame. The base material may be attached to the front portion through the drive mechanism, or the base material may be attached directly to the front portion.

The hologram diffraction grating is an optical element that makes it possible to appropriately select a path of light other than specularly reflected light (light of which an angle of incidence and an angle of reflection are different from each other), which is different from an ordinary reflective optical element. This makes it possible to arrange the optical element along the shape of the face of an observer with a high degree of freedom, and the hologram diffraction grating is a space-saving optical element suitably arranged in front of the eyes of the observer. Further, the hologram diffraction grating is a very thin optical element. This provides an advantage in making an apparatus smaller and lighter. Further, the use of a hologram diffraction grating makes it possible to display a virtual image without affecting a pencil of light entering from the outside world. This is based on two features that are the wavelength selectivity and the angular selectivity of a hologram diffraction grating. The wavelength selectivity of a hologram diffraction grating is a property of being able to change the direction of light of a specific wavelength by diffracting the light. If a light-emitting diode (LED) or a semiconductor laser element of which a wavelength band is relatively narrow is used as a light source included in the image forming apparatus and if the hologram diffraction grating is designed to only diffract light of a specified wavelength from the light source, light from the outside world will be hardly affected by the hologram diffraction grating, since a wavelength band of the light from the light source is only a portion of a wavelength band of the light from the outside world. Further, the angular selectivity of a hologram diffraction grating is a property of only diffracting light entering from a specific angle. The hologram diffraction grating only diffracts light entering from a region situated behind the optical element, on the basis of the angular selectivity. Thus, light from the outside world that enters the pupil of an observer is not affected by the hologram diffraction grating. As described above, properties suitable for a see-through head-mounted display can be obtained on the basis of the wavelength selectivity and the angular selectivity.

It is assumed that a pupillary axis of an observer is represented by the z axis, a horizontal axis that is orthogonal to the z axis is represented by the x axis, a vertical axis that is orthogonal to the z axis and the x axis is represented by the y axis, a horizontal axis that intersects the x axis in the xz plane to form an acute angle $\theta_0$ (including 0 degrees) with the x axis is represented by an X axis, a vertical axis that is orthogonal to the X axis in the xz plane is represented by a Z axis, and a vertical axis that is orthogonal to the X axis and the Z axis is represented by a Y axis. The Y axis may form an acute angle 110 with a yz plane. Note that the pupillary axis is defined by a line that passes through the center of an entrance pupil of an eyeball and is orthogonal to a corneal surface (for reference: http://www.visionsociety.jp/vision/ koumokuPDF/04lecture/L1989.01.01.pdf). In the image display apparatus or the like according to the first aspect of the present disclosure, the optical element is moved using the movement control apparatus when there is a change in the position of the pupil of an observer, and it is assumed that the optical element moves in an XY plane. $\theta_0$ may exhibit a value indicated below, although the value is not limited thereto.

−5 (degrees)≤$\theta_0$≤5 (degrees)

An image exiting the image forming apparatus obliquely enters the optical element from a region situated behind the optical element, and exits the optical element. When a pencil of light exiting a center of an image formed by the image forming apparatus (referred to as an "image-center pencil of light") enters the optical element (referred to as an entering pencil of light), and exits the optical element (referred to as an exiting pencil of light), an angle $\theta_1$ formed by the entering pencil of light and the exiting pencil of light may exhibit a value indicated below, although the value is not limited thereto.

45 (degrees)≤$\theta_1$≤80 (degrees)

In the display apparatus of the present disclosure, the frame includes a front portion that is arranged in front of an observer, two temple portions that are respectively rotatably attached to two ends of the front portion through respective hinges, and a nose pad. A temple-tip covering portion is attached to a tip of each temple portion. An assembly of the frame (including a rim portion) and the nose pad has a structure substantially the same as ordinary glasses. The nose pad may also have a well-known configuration and structure. Further, the front portion and the two temple portions may be integrated. In other words, the frame generally has substantially the same structure as ordinary glasses when the entirety of the display apparatus of the present disclosure is viewed. A material of the frame including the nose pad may be the same as the material of ordinary glasses, such as metal, an alloy, plastics, and a combination thereof.

The movement control apparatus includes a drive mechanism. For example, the drive mechanism includes a first drive apparatus and a first slide bar, and includes a second drive apparatus and a second slide bar. For example, it is sufficient if the horizontally extending first slide bar is slidably attached to the first drive apparatus, the first drive apparatus is fixed to an upper portion or a lower portion of the front portion, and the optical element (specifically, the base body) is fixed to the first slide bar. Then, the first drive apparatus is driven to slide the first slide bar with respect to the first drive apparatus, and this makes it possible to horizontally move the optical element fixed to the first slide bar. Likewise, it is sufficient if the vertically extending second slide bar is slidably attached to the second drive apparatus, the second drive apparatus is fixed to a portion situated on an ear side of the front portion, and the optical element (specifically, the base body) is fixed to the second slide bar. Then, the second drive apparatus is driven to slide the second slide bar with respect to the second drive apparatus, and this makes it possible to vertically move the optical element fixed to the second slide bar. Further, it is sufficient if the horizontally extending second slide bar is slidably attached to the second drive apparatus, the second drive apparatus is fixed to the portion situated on the ear side of the front portion, and the entirety or a portion of the image forming apparatus is fixed to the second slide bar. Then, the second drive apparatus is driven to slide the second slide bar with respect to the second drive apparatus, and this makes it possible to horizontally move the entirety or a portion of the image forming apparatus fixed to the second slide bar. Likewise, it is sufficient if the vertically extending second slide bar is slidably attached to the second drive apparatus, the second drive apparatus is fixed to the portion situated on the ear side of the front portion, and the entirety or a portion of the image forming apparatus is fixed to the second slide bar. Then, the second drive apparatus is driven to slide the second slide bar with respect to the second drive apparatus, and this makes it possible to vertically move the entirety or a portion of the image forming apparatus fixed to the second slide bar. Examples of a combination of the drive apparatus and the slide bar include a combination of a motor and a rack-and-pinion mechanism, and a combination of a motor and a ball-screw mechanism. Further, the drive mechanism may include a linear actuator.

It is favorable that a pupil position detecting mechanism used to detect the position of a pupil of an observer be attached to the front portion. The pupil position detecting mechanism may include, for example, a light-emitting section that emits infrared light, and a light-receiving section or an imaging device that receives the infrared light reflected off the pupil of the observer. Further, the pupil position detecting mechanism may include an imaging device that images the pupil of the observer.

In the image display apparatuses or the like according to the first and second aspects of the present disclosure including the various favorable configurations described above, the image forming apparatus may include a plurality of pixels arranged in a two-dimensional matrix. For convenience, the image forming apparatus having such a configuration is referred to as an "image forming apparatus having a first configuration".

Examples of the image forming apparatus having the first configuration include an image forming apparatus that includes a reflective spatial light modulating apparatus and a light source, an image forming apparatus that includes a transmissive spatial light modulating apparatus and a light source, and an image forming apparatus that includes a light-emitting element such as an organic electroluminescence (EL), an inorganic EL, a light-emitting diode (LED), and a semiconductor laser element. In particular, it is favorable that the image forming apparatus having the first configuration be the image forming apparatus including an organic-EL light-emitting element (an organic-EL display apparatus), or the image forming apparatus including a reflective spatial light modulating apparatus and a light source. Examples of the spatial light modulating apparatus include a light bulb such as a transmissive or reflective liquid crystal display apparatus of, for example, liquid crystal on silicon (LCOS); and a digital micromirror device (DMD). Examples of the light source include a light-emitting element. Further, the reflective spatial light modulating apparatus may include a liquid crystal display apparatus and a polarization beam splitter in which a portion of light from the light source is reflected off the polarization beam splitter to be guided to the liquid crystal display apparatus, and a portion of light reflected off the liquid crystal display apparatus passes through the polarization beam splitter to be guided to the optical element. A red-light-emitting element, a green-light-emitting element, a blue-light-emitting element, and a white-light-emitting element may be used as the light-emitting elements included in the light source. Further, red light, green light, and blue light that are respectively emitted by the red-light-emitting element, the green-light-emitting element, and the blue-light-emitting element may be mixed and the brightness may be made uniform using a light pipe to obtain white light. Examples of the light-emitting element include a semiconductor laser element, a solid-state laser, and an LED. It is sufficient if the number of pixels is determined on the basis of the specifications necessary for the image display apparatus. Examples of a specific value of the number of pixels include 320×240, 432×240, 640×480, 1024×768, and 1920×1080. In the image forming apparatus having the first configuration, a diaphragm may be arranged at a front focal position of a light-collecting member (described later) (a focal point on the side of the image forming apparatus).

Further, in the image display apparatuses or the like according to the first and second aspects of the present disclosure including the favorable configurations described above, the image forming apparatus may include a light source, and a scanning mechanism that scans light emitted by the light source to form an image. For convenience, such an image forming apparatus is referred to as an "image forming apparatus having a second configuration".

Examples of the light source included in the image forming apparatus having the second configuration include a light-emitting element. Specifically, a red-light-emitting element, a green-light-emitting element, a blue-light-emitting element, and a white-light-emitting element may be used as the light-emitting elements. Further, red light, green light, and blue light that are respectively emitted by the red-light-emitting element, the green-light-emitting element, and the blue-light-emitting element may be mixed and the brightness may be made uniform using a light pipe to obtain white light. Examples of the light-emitting element include a semiconductor laser element, a solid-state laser, and an LED. It is sufficient if the number of pixels (virtual pixels) in the image forming apparatus having the second configuration is also determined on the basis of the specifications necessary for the image display apparatus. Examples of a specific value of the number of pixels (virtual pixels) include 320×240, 432×240, 640×480, 1024×768, and 1920×1080. Further, when a color image is displayed and the light source includes a red-light-emitting element, a green-light-emitting element, and a blue-light-emitting element, colors may be combined using, for example, an X-prism. A microelectromechanical systems (MEMS) mirror or a galvanometer mirror that horizontally scans and vertically scans light emitted by the light source may be used as the scanning mechanism, the MEMS mirror including, for example, a two-dimensionally rotatable micromirror. In the image forming apparatus having the second configuration, the MEMS mirror or the galvanometer mirror may be arranged at a front focal position of the light-collecting member (described later) (a focal point on the side of the image forming apparatus).

For example, in the image forming apparatus having the first configuration or the image forming apparatus having the second configuration, light is formed into parallel light by the light-collecting member (an optical system that forms exiting light into parallel light), and the parallel light enters the optical element. Such a formation of light into parallel light makes it possible to cause an image to enter the optical element in a telecentric state. Specifically, for example, it is sufficient if a light exiting portion of the image forming apparatus is placed at a point (a position) corresponding to a focal length of the light-collecting member, in order to generate parallel light. Examples of the light-collecting member include an optical system that has a positive optical power as a whole and in which a convex lens, a concave lens, a freeform prism, or a hologram lens is used alone, or a combination thereof is used. A light blocking portion that includes an opening may be arranged near the light-collecting member between the light-collecting member and the optical element, in order to prevent undesired light from exiting the light-collecting member and from entering the optical element.

In the display apparatus of the present disclosure including the various favorable configurations described above, a signal used to display an image on the image forming apparatus may be received from the outside (the outside of a system of the display apparatus). In such a configuration, information and data regarding an image to be displayed on the image forming apparatus are recorded, held, or saved in, for example, a so-called cloud computer or server. When the image display apparatus includes a communication mechanism such as a phone line, an optical line, a cellular phone, or a smartphone, or when the image display apparatus and the communication mechanism are used in combination, various information and data can be communicated and exchanged between the cloud computer or server and the image display apparatus, and a signal based on various information and data, that is, the signal used to display an image on the image forming apparatus can be received. Further, the signal used to display an image on the image forming apparatus may be stored in the image display apparatus. The image displayed on the image forming apparatus includes various information and various data. The image display apparatus in the form of a wearable device may include a camera (an image-capturing apparatus). An image captured by the camera may be transmitted to a cloud computer or a server through the communication mechanism, various information and data that correspond to the image captured by the camera may be searched for in the cloud computer or the server, various information and data that are obtained by the search may be transmitted to the image display apparatus through the communication mechanism, and an image may be displayed on the image forming apparatus on the basis of the various information and data being obtained by the search.

For example, the display apparatus of the present disclosure including the various configurations described above can be used to display, for example, various information in various sites on the Internet; to display various descriptions, a symbol, a sign, a mark, an emblem, a design, and the like that are used at the time of, for example, driving, an operation, a maintenance, and disassembling of an observation target such as various apparatuses; to display various descriptions, a symbol, a sign, a mark, an emblem, a design, and the like regarding an observation target such as a person and a product; to display a moving image and a still image; to display subtitles for, for example, a movie; to display an explanatory text and closed captions regarding a video in synchronization with the video; and to display various descriptions regarding an observation target in a play, Kabuki, Noh, Kyogen, opera, a concert, a ballet, various theaters, an amusement park, a museum, a tourist spot, a resort, tourist information services, and the like, as well as, for example, an explanatory text and closed captions that are used to describe, for example, details, the progress, and the background thereof. With respect to the play, the Kabuki, the Noh, the Kyogen, the opera, the concert, the ballet, the various theaters, the amusement park, the museum, the tourist spot, the resort, the tourist information services, and the like, it is sufficient if a text related to an observation target is displayed in the form of an image on the image forming apparatus at an appropriate timing. Specifically, for example, according to the progress of, for example, a movie, or according to the progress of, for example, a play, an image control signal is transmitted to the image forming apparatus by an operation performed by an operator, or under the control of, for example, a computer, on the basis of a specified schedule and the allotment of time, and an image is displayed on the image forming apparatus. Further, various descriptions regarding an observation target such as various apparatuses, a person, and a product are displayed. An image of the observation target such as various apparatuses, a person, and a product is captured by a camera, and details of the captured image are analyzed by the image forming apparatus. This makes it possible to display, on the image forming apparatus, pre-created various descriptions regarding the observation target such as various apparatuses, a person, and a product.

First Embodiment

The image display apparatus and the display apparatus of the present disclosure are described below on the basis of embodiments. An outline of each embodiment is given in Table 1 indicated below.

TABLE 1

| Embodiment | Direction of change in pupil | Optical element | Image forming apparatus | Direction of movement of image | | Embodiment for reference |
|---|---|---|---|---|---|---|
| | | | | Horizontal | Vertical | |
| 1st | Horizontal | Moved | Fixed | ○ | | |
| 2nd | Vertical | Moved | Fixed | | ○ | |
| 3rd | Horizontal | Fixed | Entirely moved | | | |
| 4th | Vertical | Fixed | Entirely moved | | | |
| 5th | Horizontal Vertical | Moved | Entirely moved | ○ | | 1st 4th |
| 6th/7th | Horizontal Vertical | Moved | Movement of lens system | ○ | ○ | 1st 5th |
| 8th | Horizontal Vertical | | Rotation of flat mirror | ○ | ○ | 1st 5th |

Figure 2A:
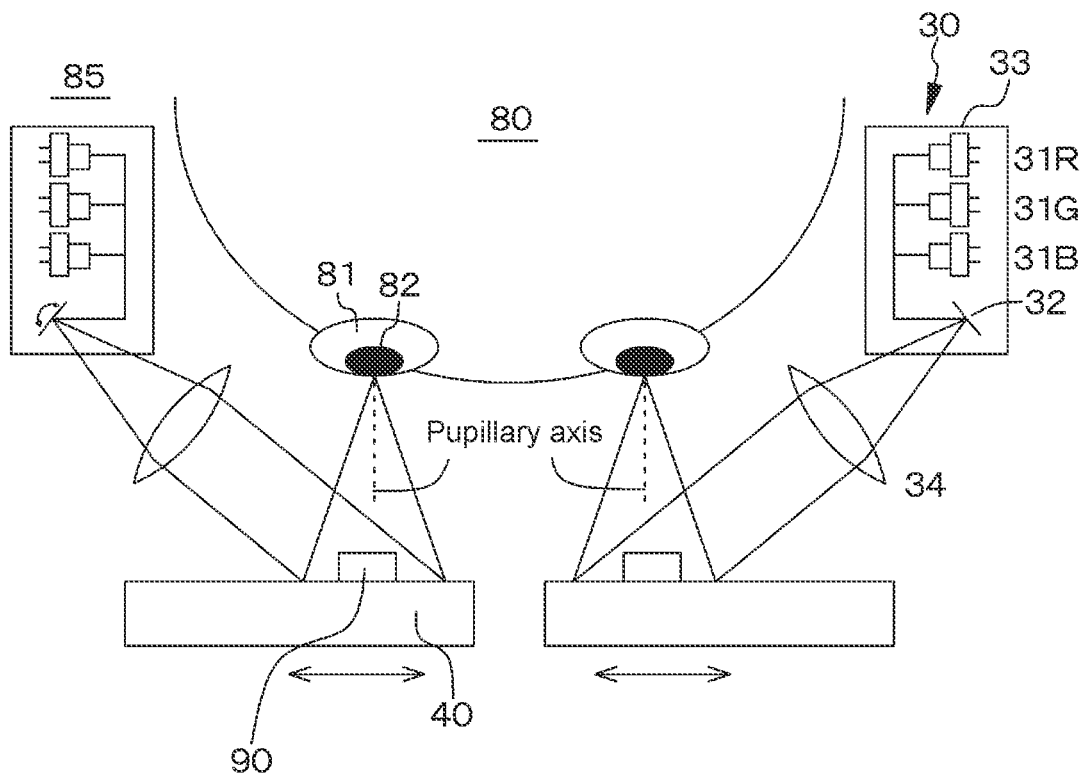
FIGS. 2A and 2B are a conceptual diagram of the display apparatus of the first embodiment, as viewed from above an observer, and a diagram used to describe a relationship between an x axis and an X axis, respectively.
Figure 2A:
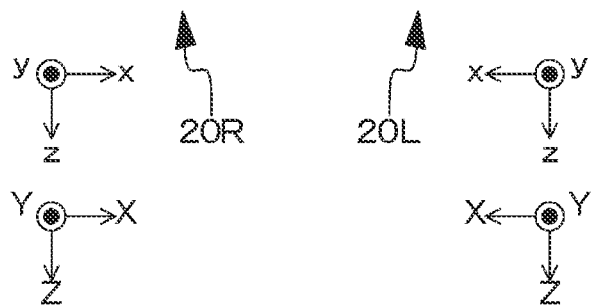

A first embodiment relates to the image display apparatus according to the first aspect of the present disclosure and the display apparatus of the present disclosure. FIG. 1 schematically illustrates the display apparatus of the first embodiment, as viewed from the front, and FIG. 2A is a conceptual diagram of the display apparatus, as viewed from above an observer. Further, FIGS. 3A, 3B, 4A, 4B, 5A, 5B, 6A, and 6B are conceptual diagrams of an optical element and the like, as viewed from above, that are used to describe an operation of the image display apparatus of the first embodiment.

The display apparatus of the first embodiment or a third embodiment described later includes
  a frame 10 that is worn by an observer 80, and
  the image display apparatus attached to the frame 10, and
  the image display apparatus is an image display apparatus 20 of the first embodiment described below or the third embodiment described later. Further, the display apparatus of the first embodiment or the third embodiment described later includes an image display apparatus 20R for a right eye and an image display apparatus 20L for a left eye, and is worn on the head of the observer 80. The display apparatus of the first embodiment or the third embodiment described later is a head-mounted display (HMD), and a Maxwellian viewing retinal projection HMD in particular.

Further, the image display apparatus 20 of the first embodiment or the third embodiment described later includes
  an image forming apparatus 30,
  an optical element 40 that is arranged in front of a face of the observer 80, and
  a movement control apparatus, in which
  when a region 85 situated on the side of the ear of the observer 80, as viewed from the optical element 40, is referred to as a region situated behind the optical element,
  the image forming apparatus 30 is arranged in the region situated behind the optical element, and
  an image exiting the image forming apparatus 30 obliquely enters the optical element 40 from the region situated behind the optical element, and is reflected off the optical element 40 to reach a pupil 82 of the observer 80.

Further, when there is a change in the position of the pupil 82 of the observer 80 (specifically, when there is a change in the position of the pupil 82 primarily due to a rotational movement of an eyeball 81 of the observer 80), the optical element 40 is moved using the movement control apparatus, and the position of an image exiting the image forming apparatus 30 is controlled using the movement control apparatus.

In the image display apparatus 20 of the first embodiment or the third embodiment described later, the frame 10 includes a front portion 11 that is arranged in front of the observer 80, two temple portions 12 that are respectively rotatably attached to two ends of the front portion 11 through respective hinges (not illustrated), and a nose pad (not illustrated). A temple-tip covering portion (not illustrated) is attached to a tip of each temple portion 12. An assembly of the frame 10 and the nose pad has a structure substantially the same as ordinary glasses. Note that the front portion 11 and the two temple portions 12 may be integrated.

In the image display apparatus 20 of the first embodiment or the third embodiment described later, the optical element 40 includes a reflective hologram diffraction grating. The reflective hologram diffraction grating includes a light-collecting function. In other words, the reflective hologram diffraction grating includes a function as a concave mirror. The image display apparatus 20 can be a semi-transmissive (see-through) image display apparatus by using a hologram diffraction grating as the optical element 40, and this makes it possible to see outside through the optical element 40. The optical element 40 is attached to a base material 41 made of a plastic material or glass (specifically, bonded to the base material 41). Further, a pencil of light exiting the image forming apparatus 30 enters the optical element 40 in a telecentric state. Furthermore, the image forming apparatus 30 includes a light-collecting member 34 that has a positive optical power and through which an image exiting the image forming apparatus 30 passes.

The movement control apparatus includes a drive mechanism, and further includes a position control circuit (not illustrated) that controls the position of an image exiting the image forming apparatus.

In other words, in a movement control apparatus 50A of the first embodiment, the drive mechanism specifically includes a first drive apparatus 51 and a first slide bar 52. Further, the position of an image exiting the image forming apparatus is controlled using the movement control apparatus 50A. Specifically, the position of an image exiting the image forming apparatus 30 is moved on the basis of a control signal from the position control circuit.

Specifically, it is sufficient if the horizontally extending first slide bar 52 is slidably attached to the first drive apparatus 51, the first drive apparatus 51 is fixed to an upper portion or a lower portion of the front portion 11 (to the upper portion in the illustrated example), and the optical element 40 is fixed to the first slide bar 52 through an attachment member 53. Here, the optical element 40 is bonded to the base body 41, and it is sufficient if the base body 41 is fixed to the attachment member 53. Then, the first drive apparatus 51 is driven to slide the first slide bar 52 with respect to the first drive apparatus 51, and this makes it possible to horizontally move the optical element 40 fixed to the first slide bar 52. Examples of a combination of the first drive apparatus 51 and the first slide bar 52, or a combination of a drive apparatus and a slide bar described below include a combination of a motor and a rack-and-pinion mechanism, and a combination of a motor and a ball-screw mechanism. Further, the drive mechanism may include a linear actuator.

The image forming apparatus 30 of the first embodiment or the third embodiment described later is the image forming apparatus having the second configuration, and the image forming apparatus having the second configuration includes, but not limited to, a light source 31R, a light source 31G, a light source 31B, and a scanning mechanism 32 that scans pieces of light respectively emitted by the light source 31R, the light source 31G, and the light source 31B to form an image.

Examples of the light source 31R, 31G, 31B included in the image forming apparatus 30 include a light-emitting element. Specifically, a red-light-emitting element 31R, a green-light-emitting element 31G, and a blue-light-emitting element 31B may be used as the light-emitting elements. Examples of the light-emitting element include a semiconductor laser element, a solid-state laser, and an LED. For example, the scanning mechanism 32 is a MEMS mirror that includes a two-dimensionally rotatable micromirror, and horizontally scans and vertically scans light emitted by the light sources 31R, 31G, and 31B. In the image forming apparatus 30, the MEMS mirror is arranged at a front focal position of the light-collecting member 34 (a focal point on the side of the image forming apparatus). The light source 31R, the light source 31G, the light source 31B, and the scanning mechanism 32 are accommodated in a housing 33, and the housing 33 is attached to, for example, the temple portion 12.

A pupil position detecting mechanism 90 used to detect the position of the pupil 82 of the observer 80 is attached to the lower portion of the front portion 11. The pupil position detecting mechanism 90 includes, for example, a light-emitting section that emits infrared light, and a light-receiving section or an imaging device that receives the infrared light reflected off the pupil 82 of the observer 80. Further, the pupil position detecting mechanism 90 may include an imaging device that images the pupil 82 of the observer 80.

In the image forming apparatus 30 of the first embodiment or the third embodiment described later, light is formed into parallel light by the light-collecting member 34 (an optical system that forms exiting light into parallel light), and the parallel light enters the optical element 40. Such a formation of light into parallel light enables an image to enter the optical element 40 in a telecentric state. Examples of the light-collecting member 34 used to generate parallel light include an optical system that has a positive optical power as a whole and in which a convex lens, a concave lens, a freeform prism, or a hologram lens is used alone, or a combination thereof is used. Note that the figures illustrate the light-collecting member 34 in the form of a single lens. However, the light-collecting member 34 may include a plurality of lenses or a combination of a lens and a prism.

Figure 2B:
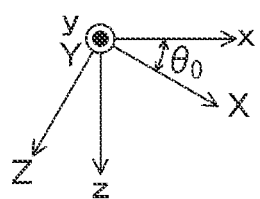

In the first embodiment, the optical element 40 is moved using the movement control apparatus 50A when there is a change in the position of the pupil 82 of the observer 80, and it is assumed that the optical element 40 moves in the XY plane. Further, θ0 described above (refer to FIG. 2B) may exhibit a value indicated below, although the value is not limited thereto.

$$-5 \text{ (degrees)} \le \theta 0 \le 5 \text{ (degrees), and}$$

specifically, θ0=0 degrees. In this case, the x axis and the X axis described above coincide with each other, the y axis and the Y axis described above coincide with each other, and the z axis and the Z axis described above coincide with each other. An image exiting the image forming apparatus 30 obliquely enters the optical element 40 from a region situated behind the optical element, and the angle θ1 (refer to FIGS. 3A and 3B) formed by a pencil of light that enters the optical element 40 and a pencil of light that exits the optical element 40 may exhibit a value indicated below, although the value is not limited thereto.

$$45 \text{ (degrees)} \le \theta 1 \le 80 \text{ (degrees), and}$$

specifically, θ0=55 degrees.

Further, in the image display apparatus 20 of the first embodiment, the optical element 40 is moved, using the movement control apparatus 50A, in a direction corresponding to a change in the position of the pupil 82 of the observer 80 in parallel with the horizontal direction (specifically, a change in the position of the pupil 82 of the observer 80 in parallel with the horizontal direction that is caused primarily due to the rotation of the eyeball 81 of the observer 80). In other words, the optical element 40 is horizontally moved using the movement control apparatus 50A.

The movements of the optical element and the like are described below with reference to FIGS. 3A, 3B, 4A, 4B, 5A, 5B, 6A, and 6B. Note that, in FIGS. 3A, 3B, 4A, 4B, 5A, 5B, 6B, 8A, 9B, 12B, 14B, and 15B, a largest region for an image that can be output by the image forming apparatus is indicated by a dot-dash line, a region for an image that is output by the image forming apparatus is indicated by a dotted line, and an image-center pencil of light is indicated by a solid line LC, LC' or LC".

Figure 3A:
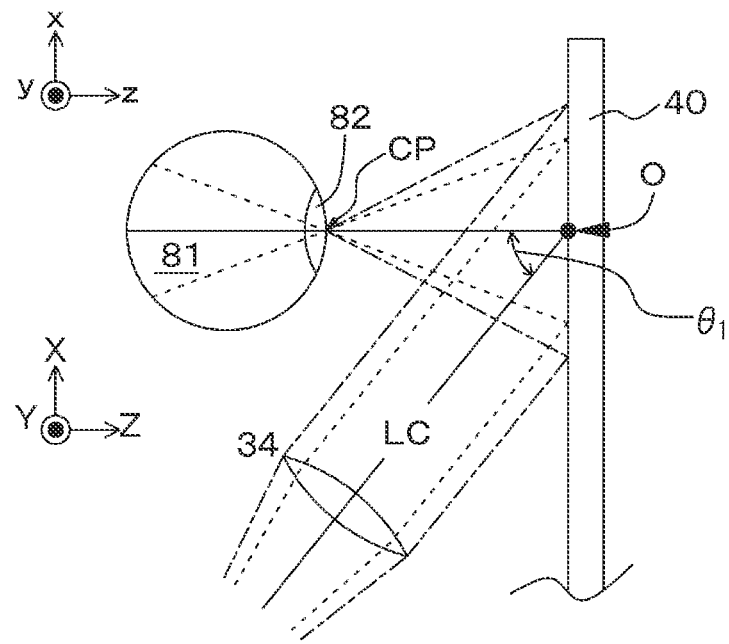
FIGS. 3A and 3B are conceptual diagrams of an optical element and the like, as viewed from above, that are used to describe an operation of an image display apparatus of the first embodiment.

As illustrated in FIG. 3A, light (an image) that exits the scanning mechanism 32 and is formed into parallel light by the light-collecting member 34 obliquely enters the optical element 40 from the region situated behind the optical element, and is reflected off the optical element 40 to reach a center CP of the pupil 82 of the observer 80. Note that the light (the image) exiting the scanning mechanism 32 is indicated by a solid line and a dotted line. The pencil of light LC indicated by the solid line represents a pencil of light exiting a center of an image formed by the image forming apparatus, and the pencil of light LC is referred to as an image-center pencil of light, as described above. Further, a center point of the optical element 40 is represented by "O". An image-center pencil of light LC enters the center point O of the optical element 40. Here, the center point of the optical element 40 is an intersection of an optical axis of the optical element 40 and the optical element 40.

Figure 3B:
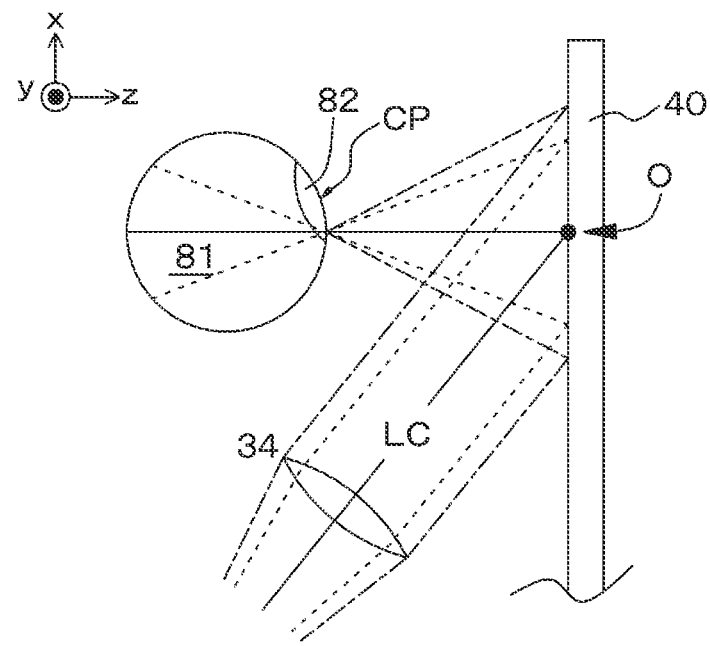

Next, it is assumed that a change in the position of the pupil 82 of the observer 80 in parallel with the horizontal direction (specifically, a change in the position of the pupil 82 of the observer 80 in parallel with the horizontal direction that is caused primarily due to the rotation of the eyeball 81 of the observer 80) is caused, as illustrated in FIG. 3B. In the illustrated example, the change in the position of the pupil 82 of the observer 80 in parallel with the horizontal direction is a rotation of the eyeball 81 of the observer 80 in a direction of a nose of the observer 80. Consequently, there is a deviation of the light convergence from the center CP of the pupil. Note that, in the figures, the nose of the observer 80 is denoted by reference numeral 83.

Figure 4A:
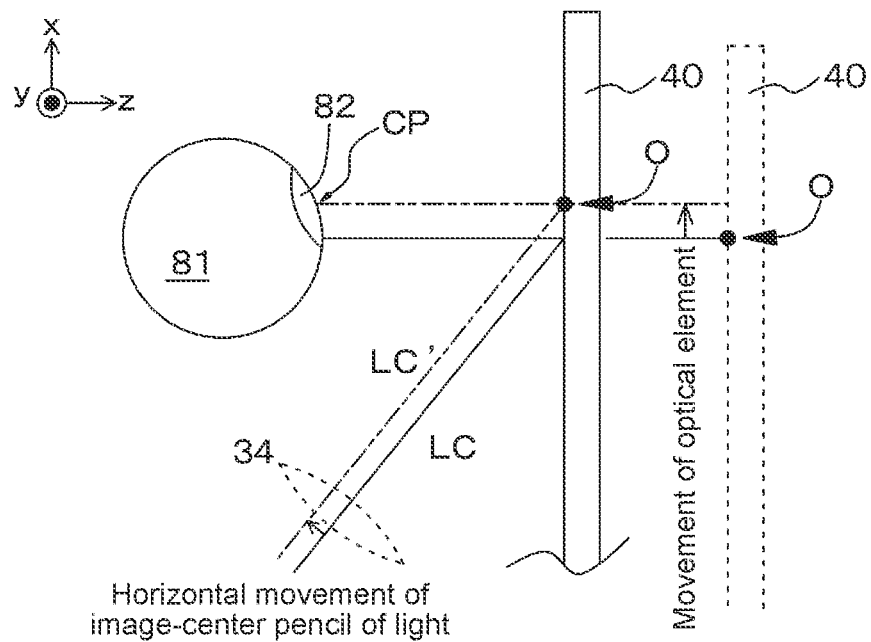
FIGS. 4A and 4B are conceptual diagrams of the optical element and the like, as viewed from above, that are subsequent to FIG. 3B and used to describe the operation of the image display apparatus of the first embodiment.

Thus, as illustrated in FIG. 4A, the optical element 40 is horizontally moved using the movement control apparatus 50A (in an X-axis direction and in a direction toward the nose of the observer 80 in the illustrated example). In this state, light (an image) that exits the scanning mechanism 32 and is formed into parallel light by the light-collecting member 34 is reflected off the optical element 40, but the image-center pencil of light LC does not reach the center CP of the pupil 82 of the observer 80. In order to cause the image-center pencil of light to reach the center CP of the pupil 82 of the observer 80, there is a need to move the image-center pencil of light LC to the position of an image-center pencil of light LC'.

Figure 4B:
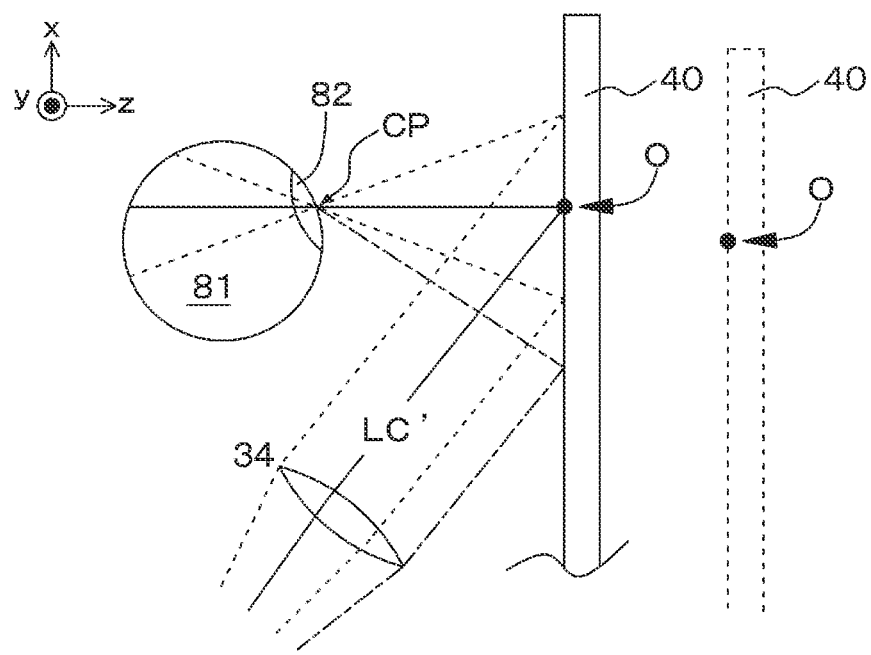
Figure 5A:
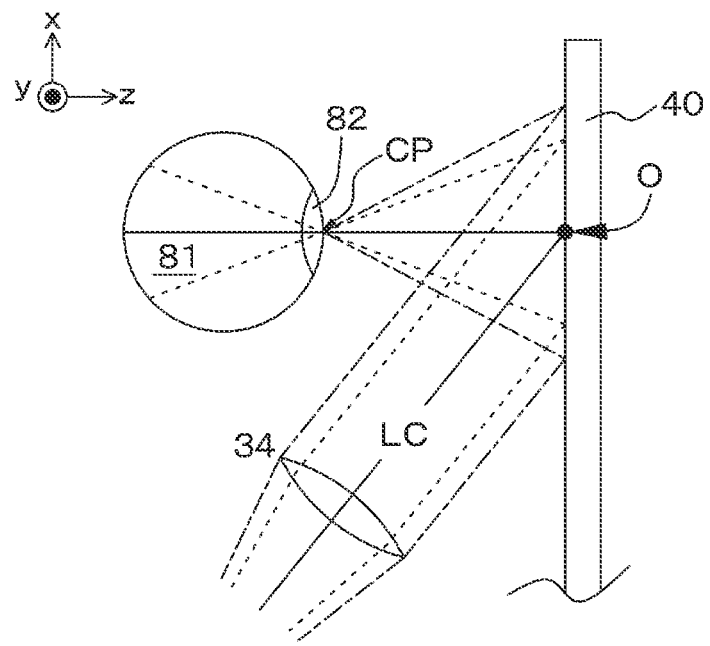
FIGS. 5A and 5B are conceptual diagrams of the optical element and the like, as viewed from above, that are used to describe the operation of the image display apparatus of the first embodiment.
Figure 5B:
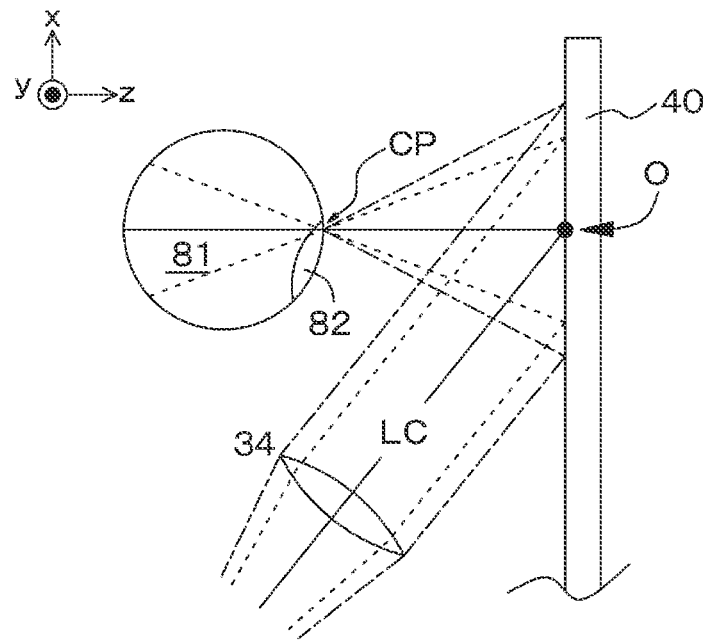
Figure 6A:
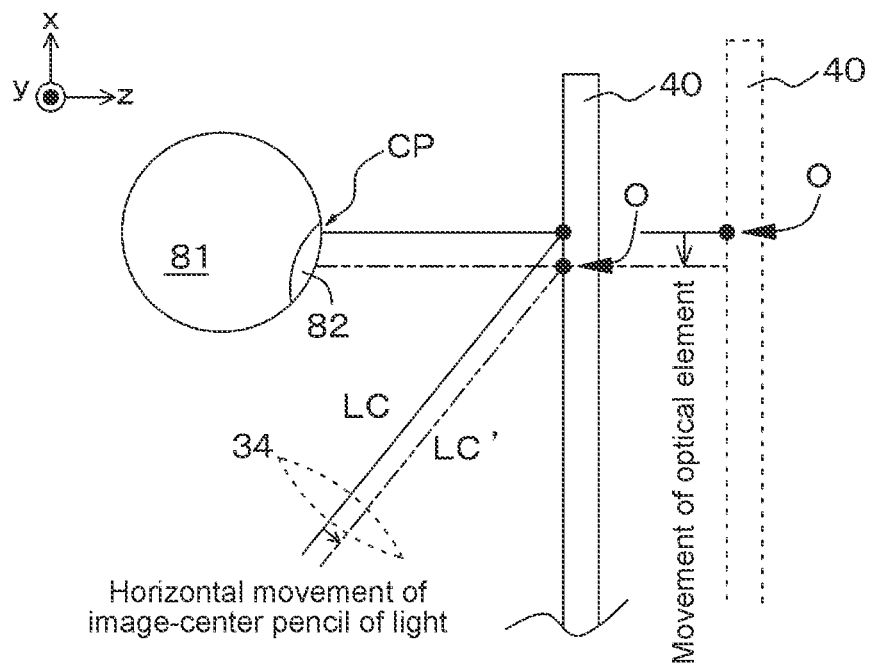
FIGS. 6A and 6B are conceptual diagrams of the optical element and the like, as viewed from above, that are subsequent to FIG. 5B and used to describe the operation of the image display apparatus of the first embodiment.
Figure 6B:
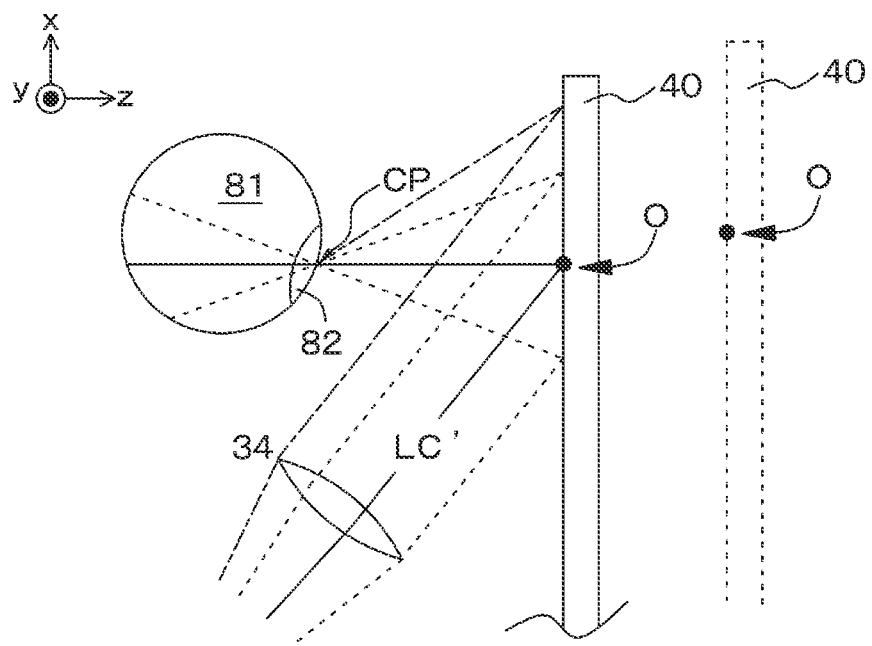

Thus, the position of an image exiting the image forming apparatus 30 is controlled using the movement control apparatus 50A. Specifically, the position of an image exiting the image forming apparatus 30 is moved on the basis of a control signal from the position control circuit included in the movement control apparatus 50A. In other words, an image formed by the image forming apparatus is moved on the basis of a control signal from the position control circuit included in the movement control apparatus 50A such that the image-center pencil of light LC' enters the center point O of the optical element 40, as illustrated in FIG. 4B. Accordingly, the image-center pencil of light LC coincides with the image-center pencil of light LC'. More specifically, the scanning mechanism 32 is designed such that the scanning mechanism 32 can scan a region larger in size than an image to be displayed. As described above, a largest region for an image that can be output by the image forming apparatus is indicated by a dot-dash line. Further, a region for an image that is output by the image forming apparatus is indicated by a dotted line. Then, it is sufficient if a portion of a region that can be scanned by the scanning mechanism 32 is used to form an image. In other words, it is sufficient if a region of an image exiting the scanning mechanism 32 is moved such that the image-center pencil of light LC' enters the center point O of the optical element 40. Accordingly, light (an image) that is formed into parallel light by the light-collecting member 34 obliquely enters the optical element 40 from the region situated behind the optical element, and is reflected off the optical element 40 to reach the center CP of the pupil 82 of the observer 80.

In the examples illustrated in FIGS. 5A, 5B, 6A, and 6B, the change in the position of the pupil 82 of the observer 80 in parallel with the horizontal direction is a rotation of the eyeball 81 of the observer in a direction of an ear of the observer. Except for this point, descriptions related to FIGS. 5A, 5B, 6A, and 6B are similar to the descriptions related to FIGS. 3A, 3B, 4A, and 4B. Thus, detailed descriptions thereof are omitted.

The image display apparatus of the first embodiment is different from conventional technologies in that the image forming apparatus is arranged in a region situated behind the optical element. An image exiting the image forming apparatus obliquely enters the optical element from the region situated behind the optical element, and is reflected off the optical element to reach the pupil of an observer. Further, when there is a change in the position of the pupil of the observer, the optical element is moved using the movement control apparatus, and the position of the image exiting the image forming apparatus is controlled using the movement control apparatus. This makes it possible to make the image display apparatus smaller and lighter. Since the image display apparatus can be made smaller and lighter, the image display apparatus can follow a quick movement of the pupil of an observer, energy (power consumption) necessary to move the optical element can be reduced, and the image display apparatus can be designed with a high degree of freedom.

Second Embodiment

Figure 7:
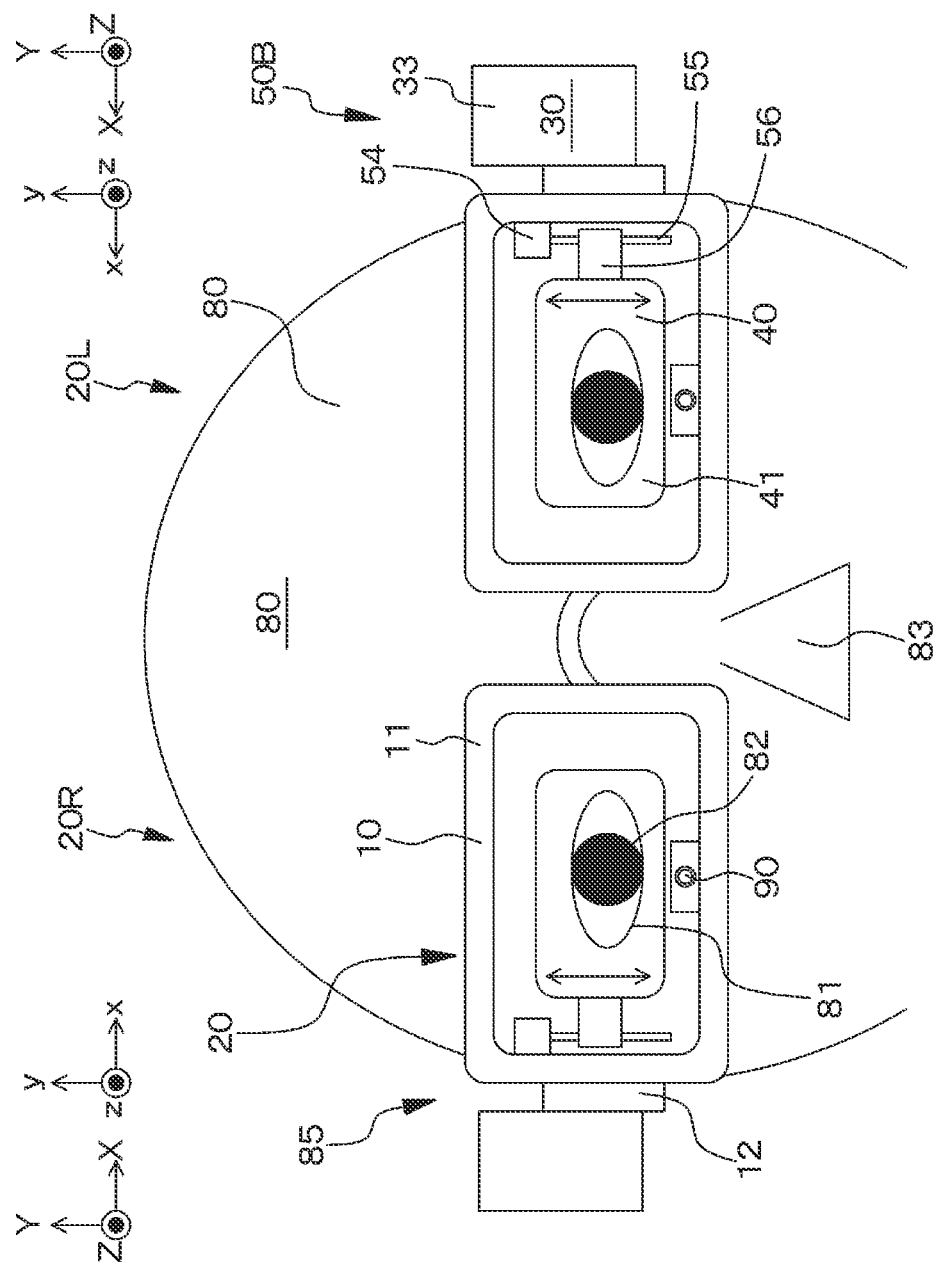
FIG. 7 schematically illustrates the display apparatus of a second embodiment, as viewed from the front.

A second embodiment is a modification of the first embodiment. FIG. 7 schematically illustrates the display apparatus of the second embodiment, as viewed from the front, and FIGS. 8A, 8B, 9A, and 9B are conceptual diagrams of the optical element and the like, as viewed from the lateral direction, that are used to describe an operation of the image display apparatus of the second embodiment.

In the image display apparatus of the second embodiment, the optical element 40 is moved, using a movement control apparatus 50B, in a direction corresponding to a change in the position of the pupil 82 of the observer 80 in parallel with the vertical direction (specifically, a change in the position of the pupil 82 of the observer 80 in parallel with the vertical direction that is caused primarily due to the rotation of the eyeball 81 of the observer 80). In other words, the optical element 40 is vertically moved using the movement control apparatus 50B.

As in the case of the first embodiment, the movement control apparatus 50B includes a drive mechanism, and further includes a position control circuit (not illustrated) that controls the position of an image exiting the image forming apparatus. Specifically, the drive mechanism includes a second drive apparatus 54 and a second slide bar 55. Further, the position of an image exiting the image forming apparatus is controlled using the movement control apparatus 50B. Specifically, the position of an image exiting the image forming apparatus 30 is moved on the basis of a control signal from the position control circuit.

More specifically, it is sufficient if the vertically extending second slide bar 55 is slidably attached to the second drive apparatus 54, the second drive apparatus 54 is fixed to a portion on an ear side of the front portion 11 (specifically, to the temple portion 12), and the optical element 40 (specifically, the base body 41) is fixed to the second slide bar 55 through an attachment member 56. Then, the second drive apparatus 54 is driven to slide the second slide bar 55 with respect to the second drive apparatus 54, and this makes it possible to vertically move the optical element 40 fixed to the second slide bar 55.

The movements of the optical element and the like are described below with reference to FIGS. 8A, 8B, 9A, and 9B.

Figure 8A:
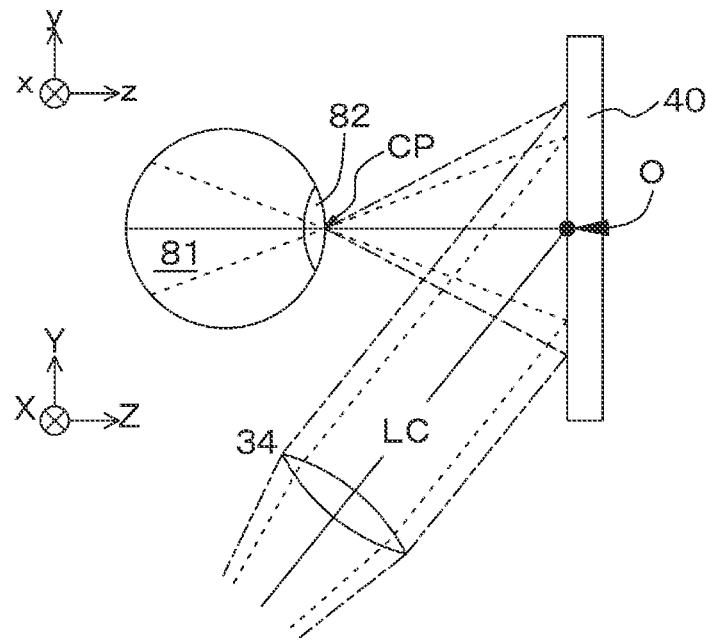
FIGS. 8A and 8B are conceptual diagrams of the optical element and the like, as viewed from the lateral direction, that are used to describe an operation of the image display apparatus of the second embodiment.

As illustrated in FIG. 8A, light (an image) that exits the scanning mechanism 32 and is formed into parallel light by the light-collecting member 34 obliquely enters the optical element 40 from the region situated behind the optical element, and is reflected off the optical element 40 to reach the center CP of the pupil 82 of the observer 80. The image-center pencil of light LC enters the center point O of the optical element 40.

Figure 8B:
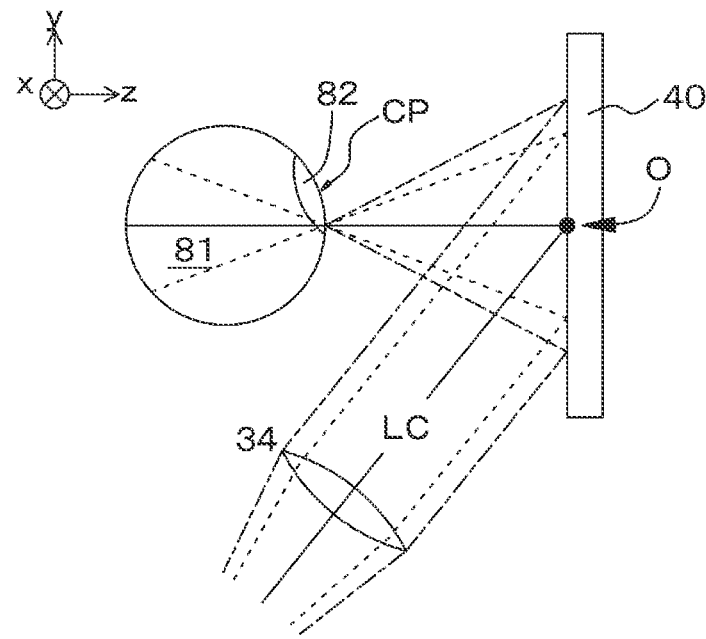

Next, it is assumed that a change in the position of the pupil 82 of the observer 80 in parallel with the vertical direction (specifically, a change in the position of the pupil 82 of the observer 80 in parallel with the vertical direction that is caused primarily due to the rotation of the eyeball 81 of the observer 80) is caused, as illustrated in FIG. 8B. In the illustrated example, the change in the position of the pupil 82 of the observer 80 in parallel with the vertical direction is a rotation of the eyeball 81 of the observer 80 in a direction of the top of the head of the observer 80. Consequently, there is a deviation of the light convergence from the center CP of the pupil.

Figure 9A:
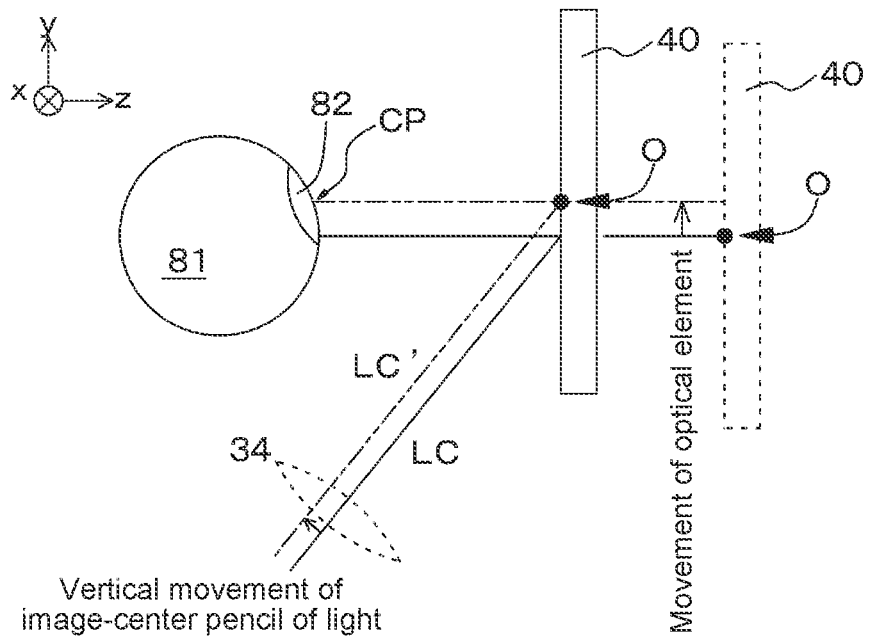
FIGS. 9A and 9B are conceptual diagrams of the optical element and the like, as viewed from the lateral direction, that are subsequent to FIG. 8B and used to describe the operation of the image display apparatus of the second embodiment.

Thus, as illustrated in FIG. 9A, the optical element 40 is vertically moved using the movement control apparatus 50B (in a Y-axis direction and in a direction toward the top of the head of the observer 80 in the illustrated example). In this state, light (an image) that exits the scanning mechanism 32 and is formed into parallel light by the light-collecting member 34 is reflected off the optical element 40, but the image-center pencil of light LC does not reach the center CP of the pupil 82 of the observer 80. In order to cause the image-center pencil of light to reach the center CP of the pupil 82 of the observer 80, there is a need to move the image-center pencil of light LC to the position of the image-center pencil of light LC'.

Figure 9B:
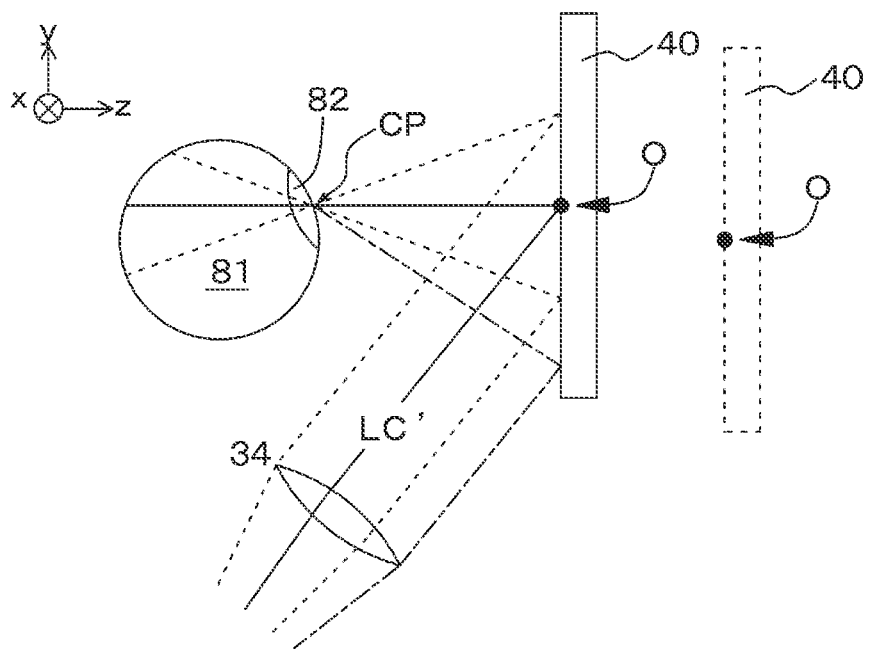

Thus, the position of an image exiting the image forming apparatus 30 is controlled using the movement control apparatus 50B. Specifically, the position of an image exiting the image forming apparatus 30 is moved on the basis of a control signal from the position control circuit included in the movement control apparatus 50B. In other words, an image formed by the image forming apparatus is moved on the basis of a control signal from the position control circuit included in the movement control apparatus 50B such that the image-center pencil of light LC' enters the center point O of the optical element 40, as illustrated in FIG. 9B. Accordingly, the image-center pencil of light LC coincides with the image-center pencil of light LC'. More specifically, as in the case the descriptions in the first embodiment, the scanning mechanism 32 is designed such that the scanning mechanism 32 can scan a region larger in size than an image to be displayed. Then, it is sufficient if a portion of a region that can be scanned by the scanning mechanism 32 is used to form an image. In other words, it is sufficient if a region of an image exiting the scanning mechanism 32 is moved such that the image-center pencil of light LC' enters the center point O of the optical element 40. Accordingly, light (an image) that is formed into parallel light by the light-collecting member 34 obliquely enters the optical element 40 from the region situated behind the optical element, and is reflected off the optical element 40 to reach the center CP of the pupil 82 of the observer 80.

Except that there is a difference in movement direction, the same applies to the case in which the position of the pupil 82 of the observer 80 is changed downward in parallel with the vertical direction.

Figure 10:
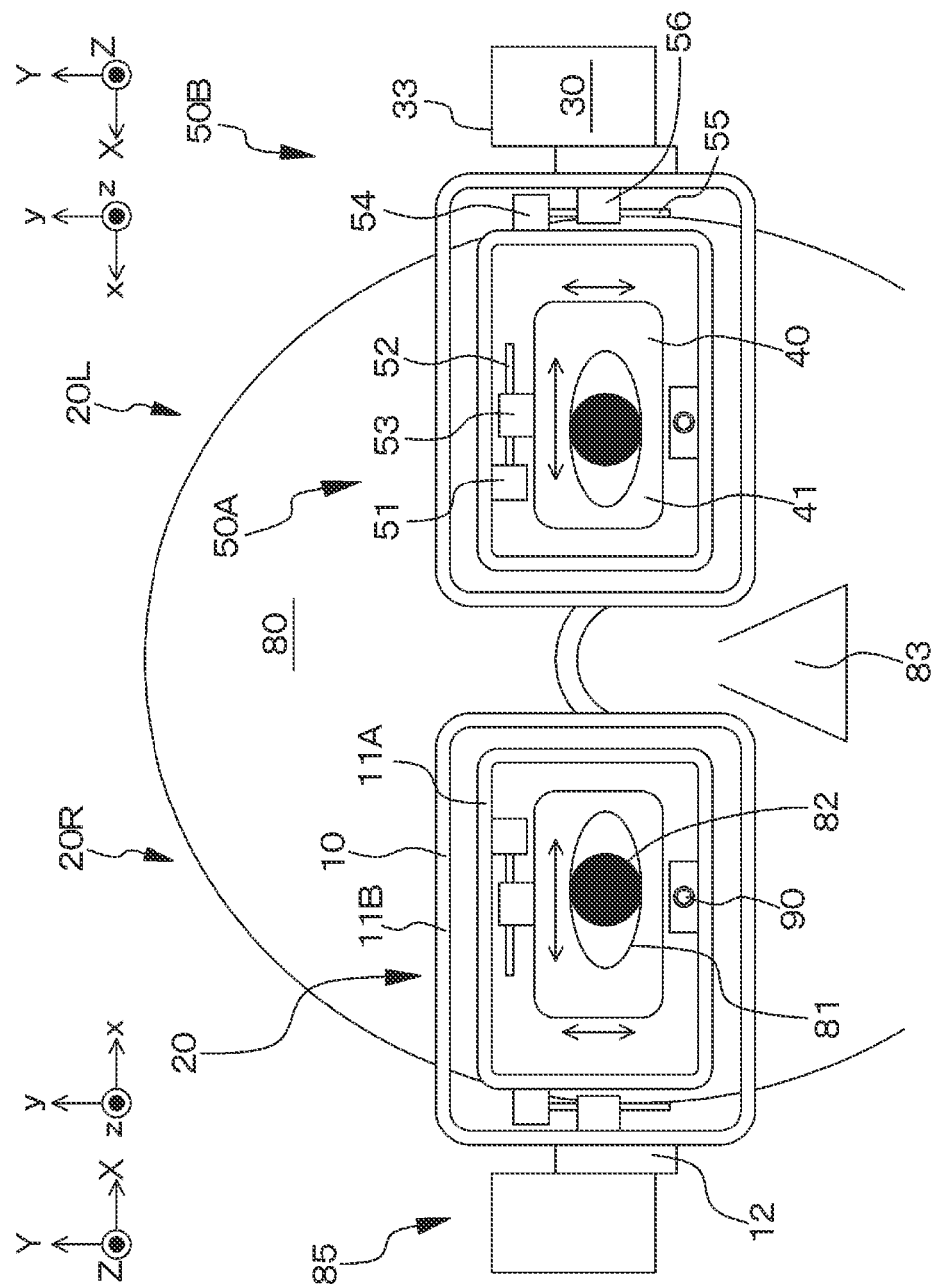
FIG. 10 schematically illustrates a modification of the display apparatus of the second embodiment, as viewed from the front.

FIG. 10 schematically illustrates a modification of the display apparatus of the second embodiment, as viewed from the front. In this modification, the optical element 40 is moved, using the movement control apparatuses 50A and 50B, in a direction corresponding to a change in the position of the pupil 82 of the observer 80 in parallel with the horizontal direction and the vertical direction (specifically, a change in the position of the pupil 82 of the observer 80 in parallel with the horizontal direction and the vertical direction that is caused due to the rotation of the eyeball 81 of the observer 80). In other words, the optical element 40 is horizontally and vertically moved using the movement control apparatuses 50A and 50B. With respect to the display apparatus illustrated in FIG. 10, it is sufficient if the movement control apparatus 50A described in the first embodiment and the movement control apparatus 50B described in the second embodiment are used in combination. The first drive apparatus 51 in the movement control apparatus 50A described in the first embodiment is fixed to a first front portion 11A. The first front portion 11A is surrounded by a second front portion 11B, the second drive apparatus 54 in the movement control apparatus 50B described in the second embodiment is fixed to the first front portion 11B, and the attachment member 56 is fixed to the second front portion 11B.

Third Embodiment

Figure 11:
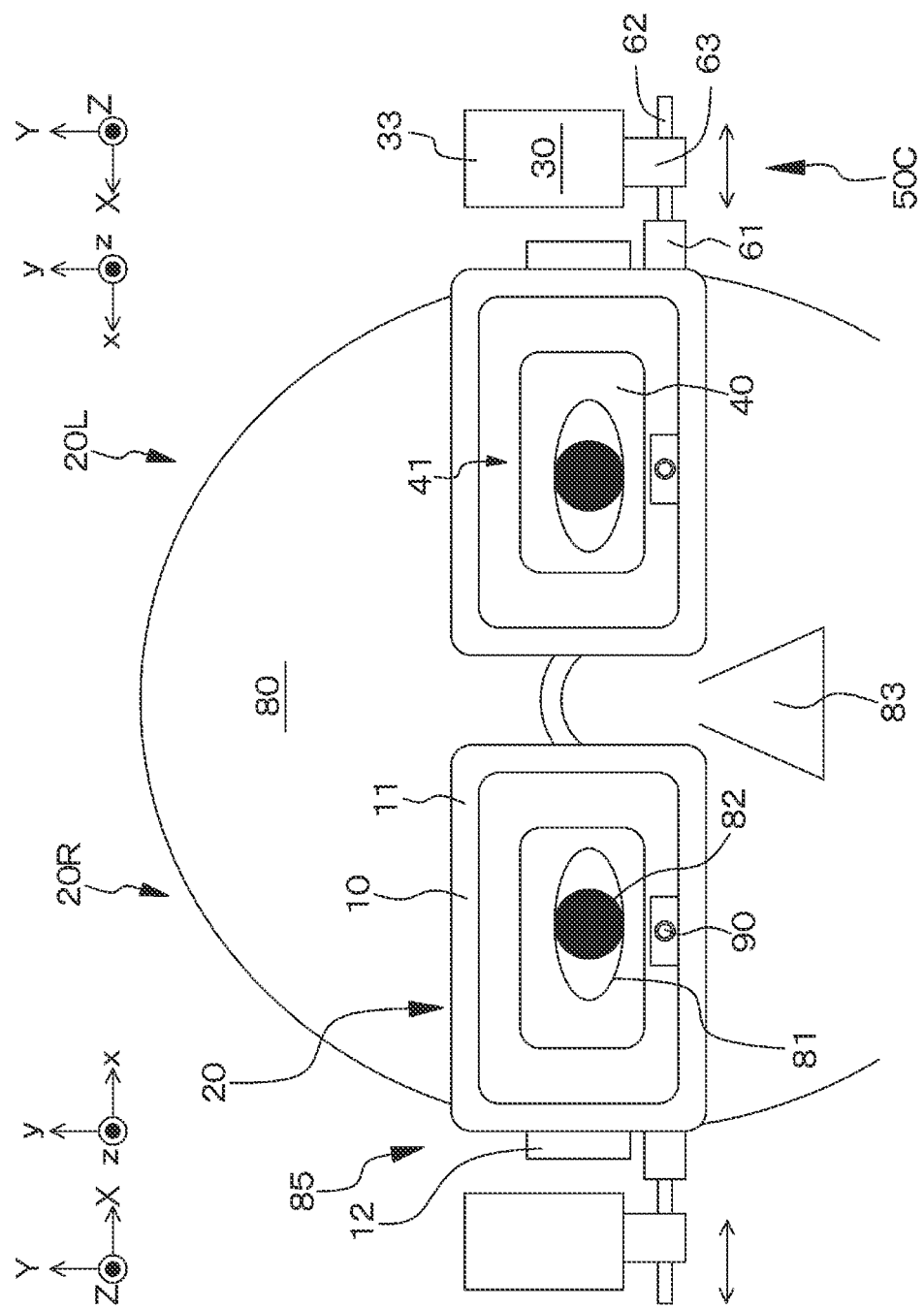
FIG. 11 schematically illustrates the display apparatus of a third embodiment, as viewed from the front.
Figure 12A:
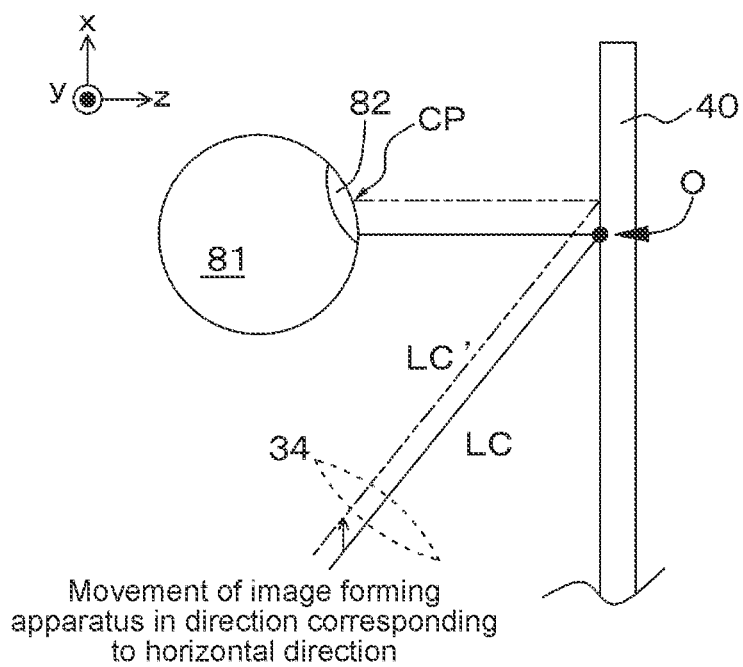
FIGS. 12A and 12B are conceptual diagrams of the optical element and the like, as viewed from above, that are used to describe an operation of the image display apparatus of the third embodiment.
Figure 12B:
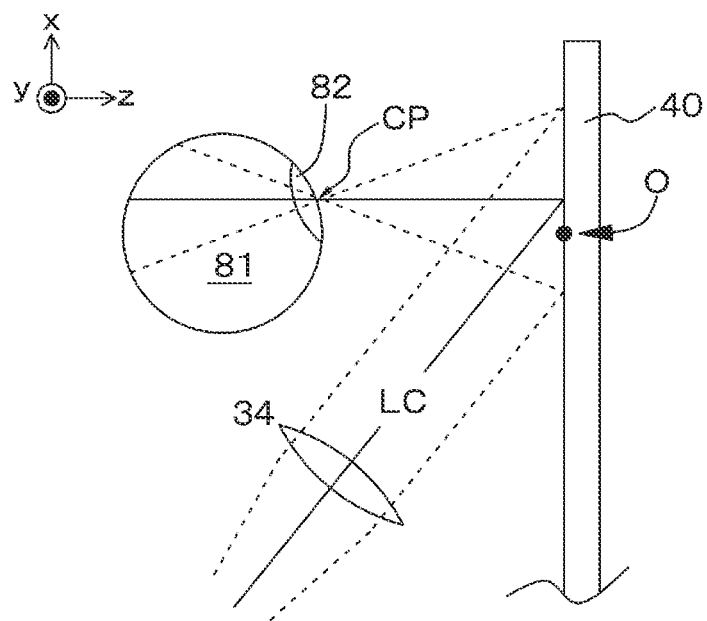

A third embodiment relates to the image display apparatus according to the second aspect of the present disclosure, and the display apparatus of the present disclosure including the image display apparatus according to the second aspect of the present disclosure. FIG. 11 schematically illustrates the display apparatus of the third embodiment, as viewed from the front, and FIGS. 12A and 12B are conceptual diagrams of the optical element and the like, as viewed from above, that are used to describe an operation of the image display apparatus of the third embodiment.

In the image display apparatus 20 of the third embodiment, when there is a change in the position of the pupil 82 of the observer 80, the image forming apparatus 30 is moved, using a movement control apparatus 50C, in a direction corresponding to the change (specifically, a change in the position of the pupil 82 of the observer 80 in parallel with the horizontal direction that is caused primarily due to the rotation of the eyeball 81 of the observer 80). Further, the display apparatus of the third embodiment includes the image display apparatus 20 of the third embodiment.

Specifically, the entirety of the image display apparatus 30 is moved, using the movement control apparatus 50C, in a direction corresponding to a change in the position of the pupil 82 of the observer 80 in parallel with the horizontal direction (that is, a change in the position of the pupil 82 of the observer 80 in parallel with the horizontal direction that is caused primarily due to the rotation of the eyeball 81 of the observer 80). In other words, the entirety of the image display apparatus 30 is horizontally moved using the movement control apparatus 50C.

The movement control apparatus 50C includes a drive mechanism. The drive mechanism includes a first drive apparatus 61 and a first slide bar 62. Specifically, it is sufficient if the horizontally extending first slide bar 62 is slidably attached to the first drive apparatus 61, the first drive apparatus 61 is fixed to a portion on the ear side of the front portion 11 (or to the temple portion 12), and the image display apparatus 30 is fixed to the first slide bar 62 through an attachment member 63. Then, the first drive apparatus 61 is driven to slide the first slide bar 62 with respect to the first drive apparatus 61, and this makes it possible to horizontally move the image display apparatus 30 fixed to the first slide bar 62.

The base body 41 to which the optical element 40 is bonded is fitted into the front portion 11.

The movements of the image forming apparatus and the like are described below with reference to FIGS. 3A, 3B, 12A, and 12B.

As illustrated in FIG. 3A, light (an image) that exits the scanning mechanism 32 and is formed into parallel light by the light-collecting member 34 obliquely enters the optical element 40 from the region situated behind the optical element, and is reflected off the optical element 40 to reach the center CP of the pupil 82 of the observer 80. The image-center pencil of light LC enters the center point O of the optical element 40.

Next, it is assumed that a change in the position of the pupil 82 of the observer 80 in parallel with the horizontal direction (specifically, a change in the position of the pupil 82 of the observer 80 in parallel with the horizontal direction that is caused primarily due to the rotation of the eyeball 81 of the observer 80) is caused, as illustrated in FIG. 3B. In the illustrated example, the change in the position of the pupil 82 of the observer 80 in parallel with the horizontal direction is a rotation of the eyeball 81 of the observer 80 in a direction of the nose of the observer 80. Consequently, there is a deviation of the light convergence from the center CP of the pupil.

Thus, as illustrated in FIG. 12A, the image display apparatus 30 is moved, using the movement control apparatus 50C, in a direction corresponding to the horizontal direction (in the X-axis direction and in the direction toward the nose of the observer 80 in the illustrated example). It is sufficient if the image-center pencil of light LC is moved to the position of the image-center pencil of light LC', in order to cause the image-center pencil of light to reach the center CP of the pupil 82 of the observer 80. Light (an image) that is formed into parallel light by the light-collecting member 34 is reflected off the optical element 40 to reach the center CP of the pupil 82 of the observer 80. FIG. 12B illustrates this state. Note that the movement of the image forming apparatus 30 is a movement of the entirety of the image forming apparatus 30, that is, a movement of the light sources 31R, 31G, and 31B, the scanning mechanism 32, the housing 33, and the light-collecting member 34. As described above, the position of an image exiting the image forming apparatus 30 is controlled using the movement control apparatus 50C. However, there is no need to move the position of an image exiting the image forming apparatus 30 on the basis of a control signal since the entirety of the image forming apparatus 30 is moved, which is different from the first and second embodiments.

Except that there is a difference in movement direction, the same applies to the case in which the position of the pupil 82 of the observer 80 is changed in a direction toward the ear of the observer 80.

The image display apparatus of the third embodiment is different from conventional technologies in that the image forming apparatus is arranged in a region situated behind the optical element. An image exiting the image forming apparatus obliquely enters the optical element from the region situated behind the optical element, and is reflected off the optical element to reach the pupil of an observer. Further, when there is a change in the position of the pupil of the observer, the image forming apparatus is moved using the movement control apparatus. This makes it possible to make the image display apparatus smaller and lighter. Since the image display apparatus can be made smaller and lighter, the image display apparatus can follow a quick movement of the pupil of an observer, energy (power consumption) necessary to move the optical element can be reduced, and the image display apparatus can be designed with a high degree of freedom. Further, the movement control apparatus is less noticeable when the image display apparatus is viewed from the front, since the image forming apparatus is arranged in the region situated behind the optical element.

Fourth Embodiment

Figure 13:
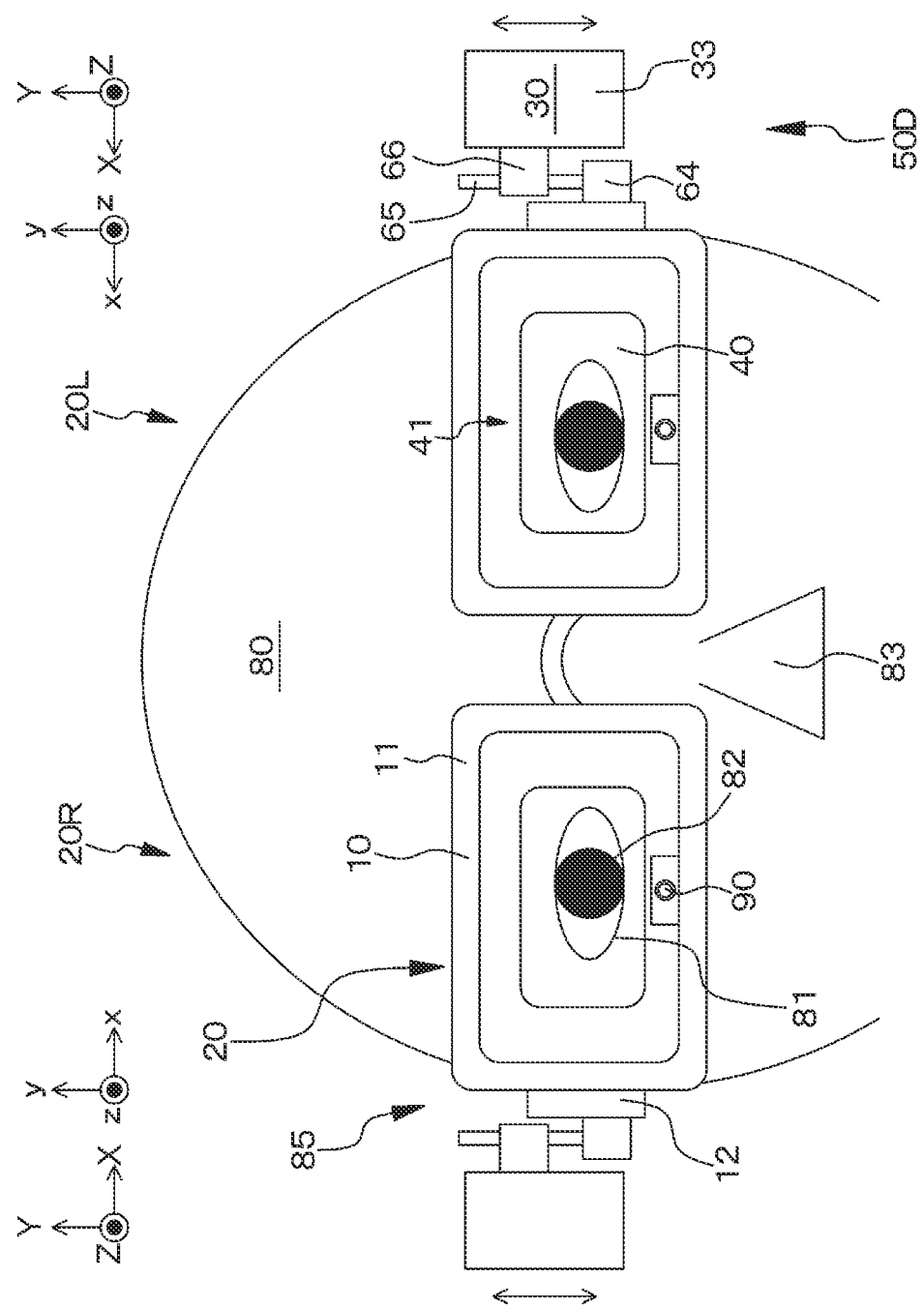
FIG. 13 schematically illustrates the display apparatus of a fourth embodiment, as viewed from the front.
Figure 14A:
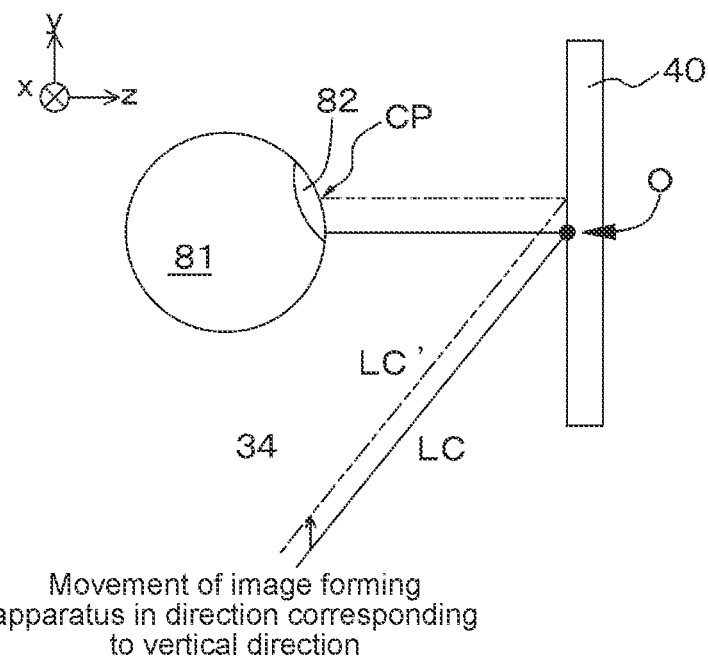
FIGS. 14A and 14B are conceptual diagrams of the optical element and the like, as viewed from the lateral direction, that are used to describe an operation of the image display apparatus of the fourth embodiment.
Figure 14B:
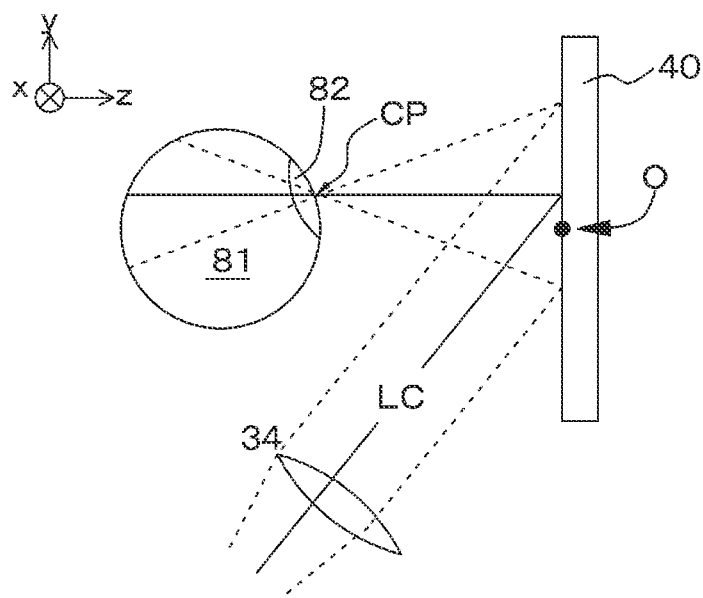

A fourth embodiment is a modification of the third embodiment. FIG. 13 schematically illustrates the display apparatus of the fourth embodiment, as viewed from the front, and FIGS. 14A and 14B are conceptual diagrams of the optical element and the like, as viewed from the lateral direction, that are used to describe an operation of the image display apparatus of the fourth embodiment.

In the image display apparatus 20 of the fourth embodiment, the entirety of the image forming apparatus 30 is moved, using a movement control apparatus 50D, in a direction corresponding to a change in the position of the pupil 82 of the observer 80 in parallel with the vertical direction (that is, a change in the position of the pupil 82 of the observer 80 in parallel with the vertical direction that is caused primarily due to the rotation of the eyeball 81 of the observer 80). In other words, the entirety of the image forming apparatus 30 is vertically moved using the movement control apparatus 50D.

The movement control apparatus 50D includes a drive mechanism. The drive mechanism includes a second drive apparatus 64 and a second slide bar 65. Specifically, it is sufficient if the vertically extending second slide bar 65 is slidably attached to the second drive apparatus 64, the second drive apparatus 64 is fixed to a portion on the ear side of the front portion 11 (or to the temple portion 12), and the image display apparatus 30 is fixed to the second slide bar 65 through an attachment member 66. Then, the second drive apparatus 64 is driven to slide the second slide bar 65 with respect to the second drive apparatus 64, and this makes it possible to vertically move the image display apparatus 30 fixed to the second slide bar 65.

The movements of the image forming apparatus and the like are described below with reference to FIGS. 8A, 8B, 14A, and 14B.

As illustrated in FIG. 8A, light (an image) that exits the scanning mechanism 32 and is formed into parallel light by the light-collecting member 34 obliquely enters the optical element 40 from the region situated behind the optical element, and is reflected off the optical element 40 to reach the center CP of the pupil 82 of the observer 80. The image-center pencil of light LC enters the center point O of the optical element 40.

Next, it is assumed that a change in the position of the pupil 82 of the observer 80 in parallel with the vertical direction (specifically, a change in the position of the pupil 82 of the observer 80 in parallel with the vertical direction that is caused primarily due to the rotation of the eyeball 81 of the observer 80) is caused, as illustrated in FIG. 8B. In the illustrated example, the change in the position of the pupil 82 of the observer 80 in parallel with the vertical direction is a rotation of the eyeball 81 of the observer 80 in a direction of the top of the head of the observer 80. Consequently, there is a deviation of the light convergence from the center CP of the pupil.

Thus, as illustrated in FIG. 14A, the image display apparatus 30 is moved, using the movement control apparatus 50D, in a direction corresponding to the vertical direction (in the Y-axis direction and in the direction toward the top of the head of the observer 80 in the illustrated example). It is sufficient if the image-center pencil of light LC is moved to the position of the image-center pencil of light LC', in order to cause the image-center pencil of light to reach the center CP of the pupil 82 of the observer 80. Light (an image) that is formed into parallel light by the light-collecting member 34 is reflected off the optical element 40 to reach the center CP of the pupil 82 of the observer 80. FIG. 14B illustrates this state. Note that, as in the case of the third embodiment, the movement of the image forming apparatus 30 is a movement of the entirety of the image forming apparatus 30, that is, a movement of the light sources 31R, 31G, and 31B, the scanning mechanism 32, the housing 33, and the light-collecting member 34. As described above, the position of an image exiting the image forming apparatus 30 is controlled using the movement control apparatus 50D. However, as in the case of the third embodiment, there is no need to move the position of an image exiting the image forming apparatus 30 on the basis of a control signal since the entirety of the image forming apparatus 30 is moved.

In a modification of the image display apparatus 20 of the fourth embodiment, the image forming apparatus 30 is moved, using the movement control apparatuses, in a direction corresponding to a change in the position of the pupil 82 of the observer 80 in parallel with the horizontal direction and the vertical direction (specifically, a change in the position of the pupil 82 of the observer 80 in parallel with the horizontal direction and the vertical direction that is caused due to the rotation of the eyeball 81 of the observer 80). In other words, the image forming apparatus 30 is horizontally and vertically moved using the movement control apparatuses. Specifically, it is sufficient if the movement control apparatus 50C and the movement control apparatus 50D are used in combination.

Fifth Embodiment

A fifth embodiment is a combination of the first and fourth embodiments. In the image display apparatus of the fifth embodiment, in a direction corresponding to a change in the position of the pupil 82 of the observer 80 in parallel with the horizontal direction and the vertical direction (specifically, a change in the position of the pupil 82 of the observer 80 in parallel with the horizontal direction and the vertical direction that is caused due to the rotation of the eyeball 81 of the observer 80), the optical element 40 is moved using the movement control apparatus 50A and the image forming apparatus 30 is moved using the movement control apparatus 50D. In other words, the optical element 40 is horizontally moved using the movement control apparatus 50A, and the image forming apparatus 30 is vertically moved using the movement control apparatus 50D. Except for the points described above, the configurations and the structures of the image display apparatus and the display apparatus of the fifth embodiment are similar to the configurations and the structures of the image display apparatus and the display apparatus of the first embodiment, and to the configurations and the structures of the image display apparatus and the display apparatus of the fourth embodiment. Thus, detailed descriptions thereof are omitted.

Sixth Embodiment

Figure 15A:
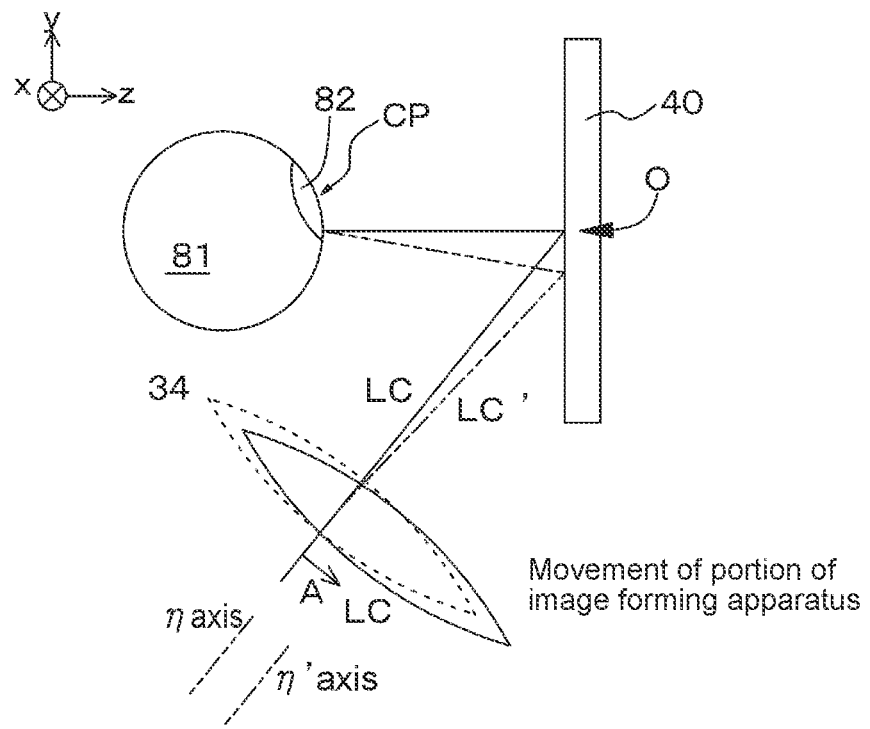
FIGS. 15A and 15B are conceptual diagrams of the optical element and the like, as viewed from the lateral direction, that are used to describe operations of the image display apparatuses of a sixth embodiment and a seventh embodiment.
Figure 15B:
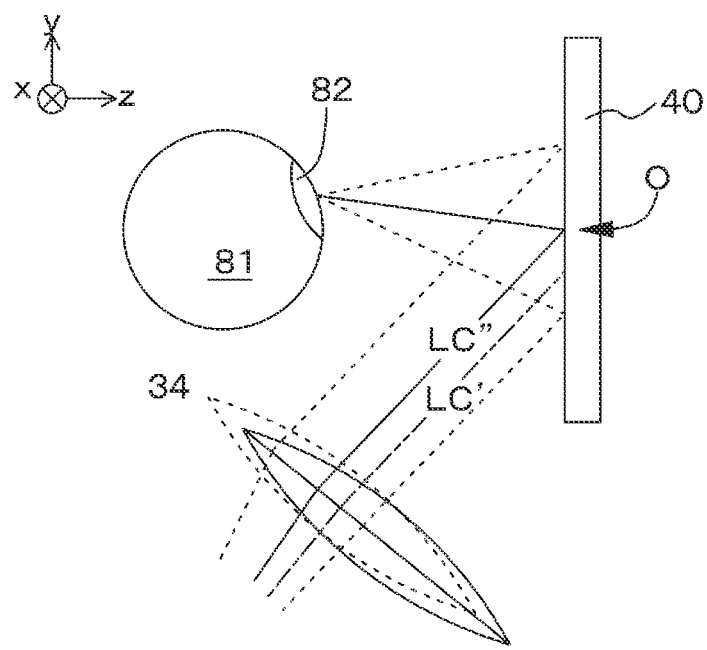

A sixth embodiment is a modification of the fifth embodiment. FIGS. 15A and 15B are conceptual diagrams of the optical element and the like, as viewed from the lateral direction, that are used to describe an operation of the image display apparatus of the sixth embodiment.

As illustrated in FIG. 14B, in the image display apparatus of the fourth embodiment, light (an image) that exits the scanning mechanism 32 and is formed into parallel light by the light-collecting member 34 is reflected off the optical element 40 to reach the center CP of the pupil 82 of the observer 80. However, the image-center pencil of light LC enters a point shifted from the center point O of the optical element 40. This may result in an increased aberration.

The movements of the image forming apparatus and the like are described below with reference to FIGS. 8A, 8B, 15A, and 15B.

As illustrated in FIG. 8A, light (an image) that exits the scanning mechanism 32 and is formed into parallel light by the light-collecting member 34 obliquely enters the optical element 40 from the region situated behind the optical element, and is reflected off the optical element 40 to reach the center CP of the pupil 82 of the observer 80. The image-center pencil of light LC enters the center point O of the optical element 40.

Next, it is assumed that a change in the position of the pupil 82 of the observer 80 in parallel with the vertical direction (specifically, a change in the position of the pupil 82 of the observer 80 in parallel with the vertical direction that is caused primarily due to the rotation of the eyeball 81 of the observer 80) is caused, as illustrated in FIGS. 8B and 15A. In the illustrated examples, the change in the position of the pupil 82 of the observer 80 in parallel with the vertical direction is a rotation of the eyeball 81 of the observer 80 in a direction of the top of the head of the observer 80 (in an upward direction). Consequently, there is a deviation of the light convergence from the center CP of the pupil. The image-center pencil of light in this state is indicated by the solid line LC, where the image-center pencil of light LC enters the center point O of the optical element 40.

Thus, as illustrated in FIGS. 15A and 15B, the image-center pencil of light LC (refer to FIG. 15A) is rotated centered at the center point O of the optical element 40 (refer to the image-center pencil of light LC' in FIG. 15A), and is moved (refer to an image-center pencil of light LC" in FIG. 15B). Consequently, the image-center pencil of light LC" obtained by the rotation and movement enters the center point O of the optical element 40, and also reaches the center CP of the pupil. When the image-center pencil of light LC enters the light-collecting member 34 along an optical axis of the light-collecting member 34 (the optical axis of the light-collecting member 34 in this case is referred to as an "optical axis η" for convenience), it is sufficient if the light-collecting member 34 is moved using the movement control apparatus in a direction orthogonal to the optical axis η, in order to achieve the state described above. The optical axis of the light-collecting member 34 after the movement of the light-collecting member 34 is referred to as an "optical axis η'" for convenience. Accordingly, the image-center pencil of light LC' that is parallel to the optical axis η' enters the light-collecting member 34, but the image-center pencil of light LC' enters a point shifted from the center point O of the optical element 40, as illustrated in FIG. 15A. Thus, an image formed by the image forming apparatus is moved on the basis of a control signal from the position control circuit included in the movement control apparatus, such that the image-center pencil of light LC' enters the center point O of the optical element 40. Accordingly, the image-center pencil of light LC" enters the center point O of the optical element 40, as illustrated in FIG. 15B.

As in the case of the first embodiment, the movement control apparatus includes a drive mechanism, and a position control circuit that controls the position of an image exiting the image forming apparatus. Specifically, the drive mechanism includes the first drive apparatus 51 and the first slide bar 52. Further, the position of an image exiting the image forming apparatus is controlled using the movement control apparatus. Specifically, as in the case of the first embodiment, the position of an image exiting the image forming apparatus 30 is moved in a direction corresponding to the X-axis direction, on the basis of a control signal from the position control circuit.

As in the case of the fourth embodiment, the drive mechanism further includes the second drive apparatus 64 and the second slide bar 65. The vertically extending second slide bar 65 is slidably attached to the second drive apparatus 64, the second drive apparatus 64 is fixed to a portion on the ear side of the front portion 11 (or to the temple portion 12), and the light-collecting member 34 is fixed to the second slide bar 65 through the attachment member 66. The light sources 31R, 31G, and 31B, and the scanning mechanism 32 are fixed, that is, immobile, which is different from the fourth embodiment. Then, the second drive apparatus 64 is driven to slide the second slide bar 65 with respect to the second drive apparatus 64, and this makes it possible to move the light-collecting member 34 fixed to the second slide bar 65 in a direction orthogonal to the optical axis of the light-collecting member 34 (that is, a direction corresponding to the Y-axis direction). Further, the position of an image exiting the image forming apparatus 30 is moved in a direction corresponding to the Y-axis direction, on the basis of a control signal from the position control circuit.

When the optical element 40 is moved, using the movement control apparatuses 50A and 50B, in a direction corresponding to a change in the position of the pupil 82 of the observer 80 in parallel with the horizontal direction and the vertical direction (that is, when the optical element 40 is horizontally and vertically moved using the movement control apparatuses 50A and 50B), as in the case of the modification of the display apparatus of the second embodiment illustrated in FIG. 10, this may result in there being room for improvement in the design of the display apparatus when the display apparatus is viewed from the front. Further, when the image display apparatus 30 is moved, using the movement control apparatus, in a direction corresponding to a change in the position of the pupil 82 of the observer 80 in parallel with the horizontal direction (that is, when the image display apparatus 30 is horizontally moved using the movement control apparatus), as in the case of the third embodiment, this may result in an increased aberration due to the horizontal movement of the image display apparatus 30.

In the fifth embodiment or the sixth embodiment, in a direction corresponding to a change in the position of the pupil 82 of the observer 80 in parallel with the horizontal direction and the vertical direction, the optical element 40 is moved and the image forming apparatus 30 or a portion of the image forming apparatus 30 is moved using the respective movement control apparatuses. In other words, using the respective movement control apparatuses, the optical element 40 is horizontally moved and the image forming apparatus 30 or a portion of the image forming apparatus 30 is vertically moved. When the display apparatus is viewed from the front, the movement control apparatus 50A for the optical element 40 is noticeable, whereas the movement control apparatus for the image forming apparatus 30 is not noticeable. Thus, the display apparatus has a more excellent design.

In general, an aberration generated in an eccentric optical system due to the movements of an optical component and an optical apparatus is larger in an eccentric direction. In other words, an aberration generated due to the movement of the optical element 40 in an XZ plane (a horizontal movement of the optical element 40) is larger than an aberration generated due to the movement of the optical element 40 in a YZ plane. An aberration generated due to the horizontal movement of the image forming apparatus 30 is larger than an aberration generated due to the vertical movement of the image forming apparatus 30. Further, a distance from the pupil 82 of the observer 80 to the image forming apparatus 30 is longer than a distance from the pupil 82 of the observer 80 to the optical element 40. Thus, when an impact of an aberration generated due to the movement of the optical element 40 in the XZ plane (the horizontal movement of the optical element 40) is compared with an impact of an aberration generated due to a horizontal movement of the image forming apparatus 30, the impact of an aberration is larger in the latter case. Thus, when the optical element 40 is moved in a direction corresponding to a change in the position of the pupil 82 of the observer 80 in parallel with the horizontal direction, and when a portion of the image forming apparatus 30 is moved in a direction corresponding to a change in the position of the pupil 82 of the observer 80 in parallel with the vertical direction, this makes it possible to more certainly suppress impacts of aberrations due to these movements.

Further, it is sufficient if a portion of the image forming apparatus 30 is moved in the sixth embodiment or a seventh embodiment described later. This makes it possible to reduce the amount of movement, to follow the movement of a pupil more quickly, and to reduce energy consumption (power consumption).

Seventh Embodiment

Figure 16A:
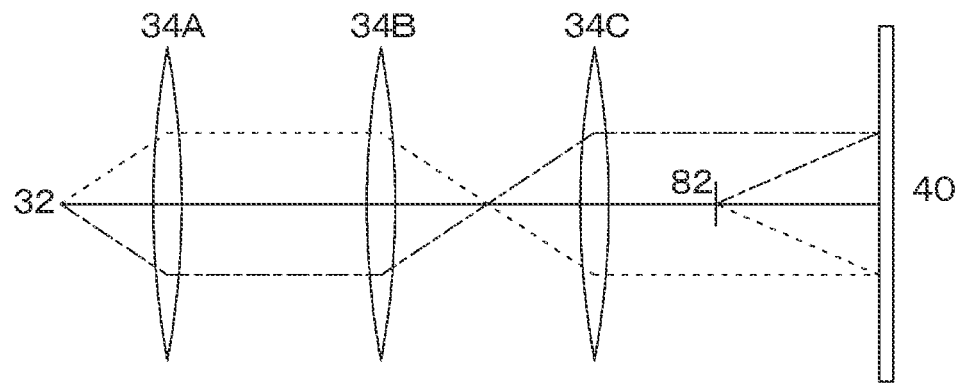
FIGS. 16A, 16B, and 16C are principle diagrams used to describe a light-collecting member that is included in the image forming apparatus of the seventh embodiment.
Figure 16B:
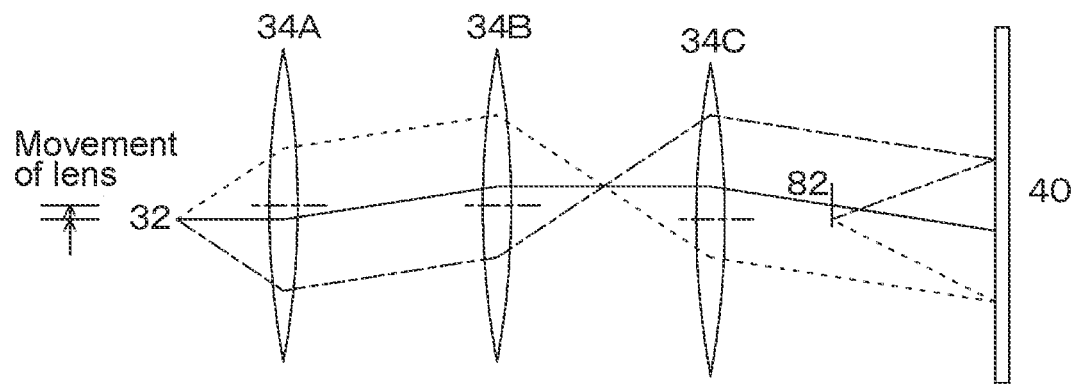
Figure 16C:
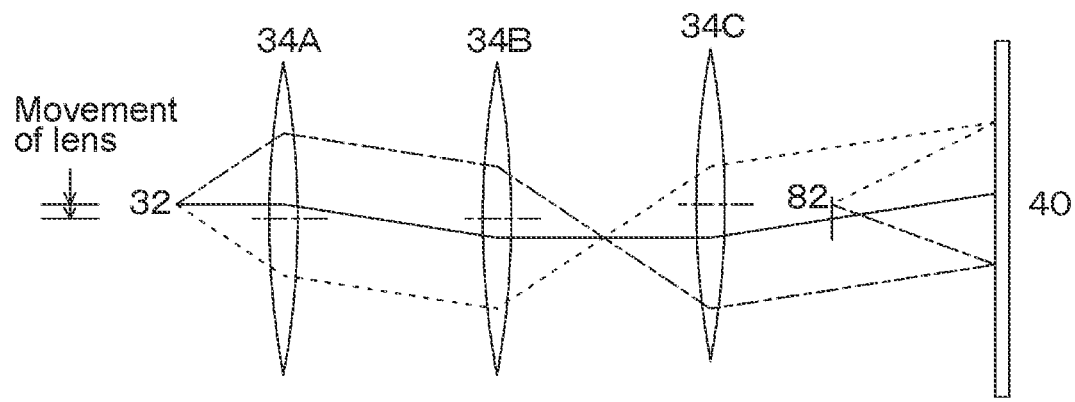

A seventh embodiment is a modification of the sixth embodiment. FIGS. 16A, 16B, and 16C are principle diagrams used to describe a light-collecting member included in the image forming apparatus of the seventh embodiment. In the image display apparatus of the seventh embodiment, according to a change in the position of the pupil 82 of the observer 80 in parallel with the horizontal direction and the vertical direction (specifically, a change in the position of the pupil 82 of the observer 80 in parallel with the horizontal direction and the vertical direction that is caused due to the rotation of the eyeball 81 of the observer 80), the optical element 40 is horizontally moved using the movement control apparatus 50A and an image is vertically moved using a 4f optical system described below.

Specifically, in the image display apparatus 20 of the seventh embodiment, the image forming apparatus 30 includes a 4f optical system through which an image exiting the image forming apparatus 30 passes, and the 4f optical system is moved, using the movement control apparatus, in a direction corresponding to a change in the position of the pupil 82 of the observer 80 in parallel with the vertical direction. More specifically, the 4f optical system includes a first lens 34A, a second lens 34B, and a third lens 34C, and the scanning mechanism 32 is situated at a focal position of the first lens 34A on the side of the scanning mechanism. Further, a focal position of the second lens 34B on the side of the optical element, and a focal position of the third lens 34C on the side of the scanning mechanism coincide. Note that, in the figure, the optical axis of a lens is indicated by a dot-dash line. Then, the first lens 34A and the second lens 34B are moved in a direction orthogonal to their optical axes. The light sources 31R, 31G, and 31B, the scanning mechanism 32, and the third lens 34C are fixed and immobile. The amount of movement of the lenses 34A and 34B can be half the amount of movement of the light-collecting member 34 in the sixth embodiment by using the 4f optical system having such a configuration.

Eighth Embodiment

Figure 17:
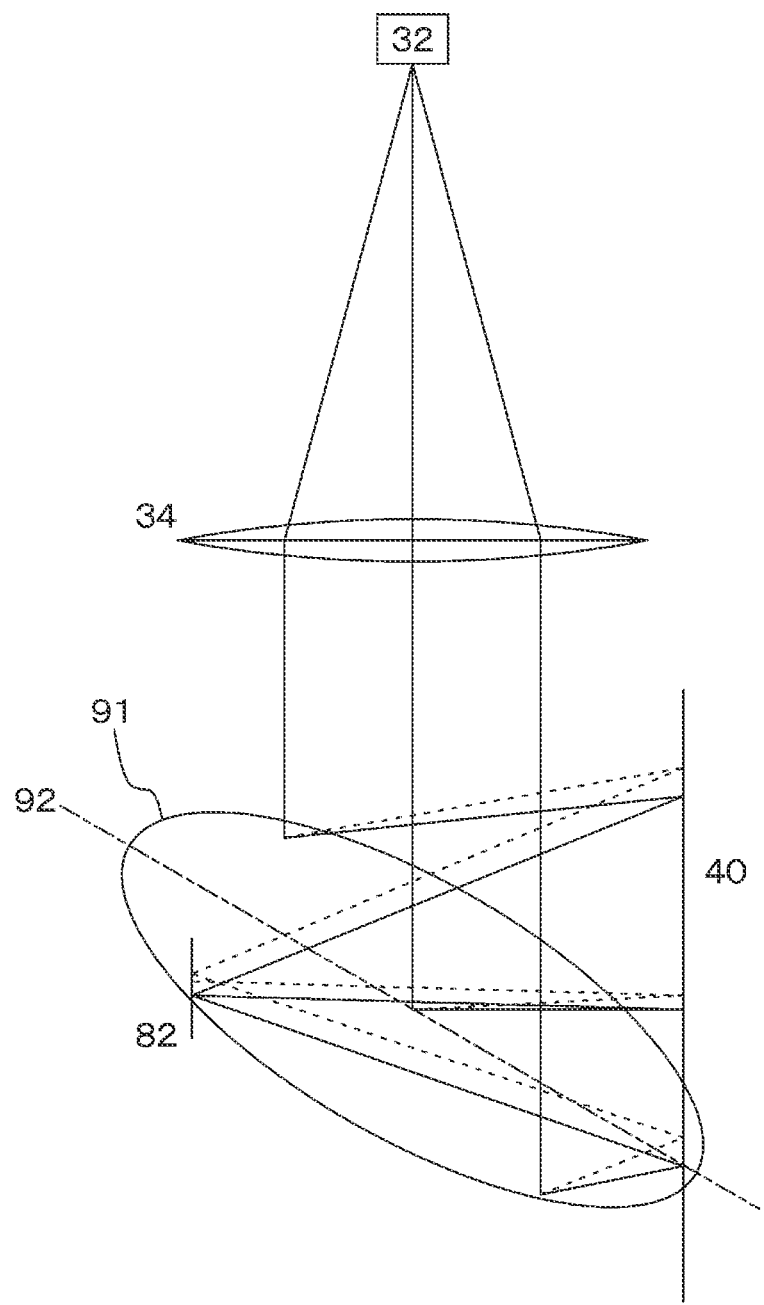
FIG. 17 is a conceptual diagram of the image display apparatus included in the display apparatus of an eighth embodiment.

An eighth embodiment is another modification of the sixth embodiment. FIG. 17 is a conceptual diagram of the image display apparatus included in the display apparatus of the eighth embodiment. In the image display apparatus of the eighth embodiment, according to a change in the position of the pupil 82 of the observer 80 in parallel with the vertical direction (specifically, a change in the position of the pupil 82 of the observer 80 in parallel with the vertical direction that is caused due to the rotation of the eyeball 81 of the observer 80), an image entering the optical element 40 is vertically moved using a reflecting mirror 91. In other words, in the eighth embodiment, the movement control apparatus includes the reflecting mirror 91 off which an image exiting the image forming apparatus 30 is reflected, and the reflecting mirror 91 is rotated about a rotational axis 92 using the movement control apparatus to change the light reflection angle of the reflecting mirror 91. This results in being able to cause an image exiting the image forming apparatus 30 to reach the pupil 82 of the observer 80 with certainty. The reflecting mirror 91 is arranged between the light-collecting member 34 and the optical element 40. Note that it is sufficient if the optical element 40 is horizontally moved on the basis of the first embodiment, according to a change in the position of the pupil 82 of the observer 80 in parallel with the horizontal direction (specifically, a change in the position of the pupil 82 of the observer 80 in parallel with the horizontal direction that is caused due to the rotation of the eyeball 81 of the observer 80).

Ninth Embodiment

Figure 18:
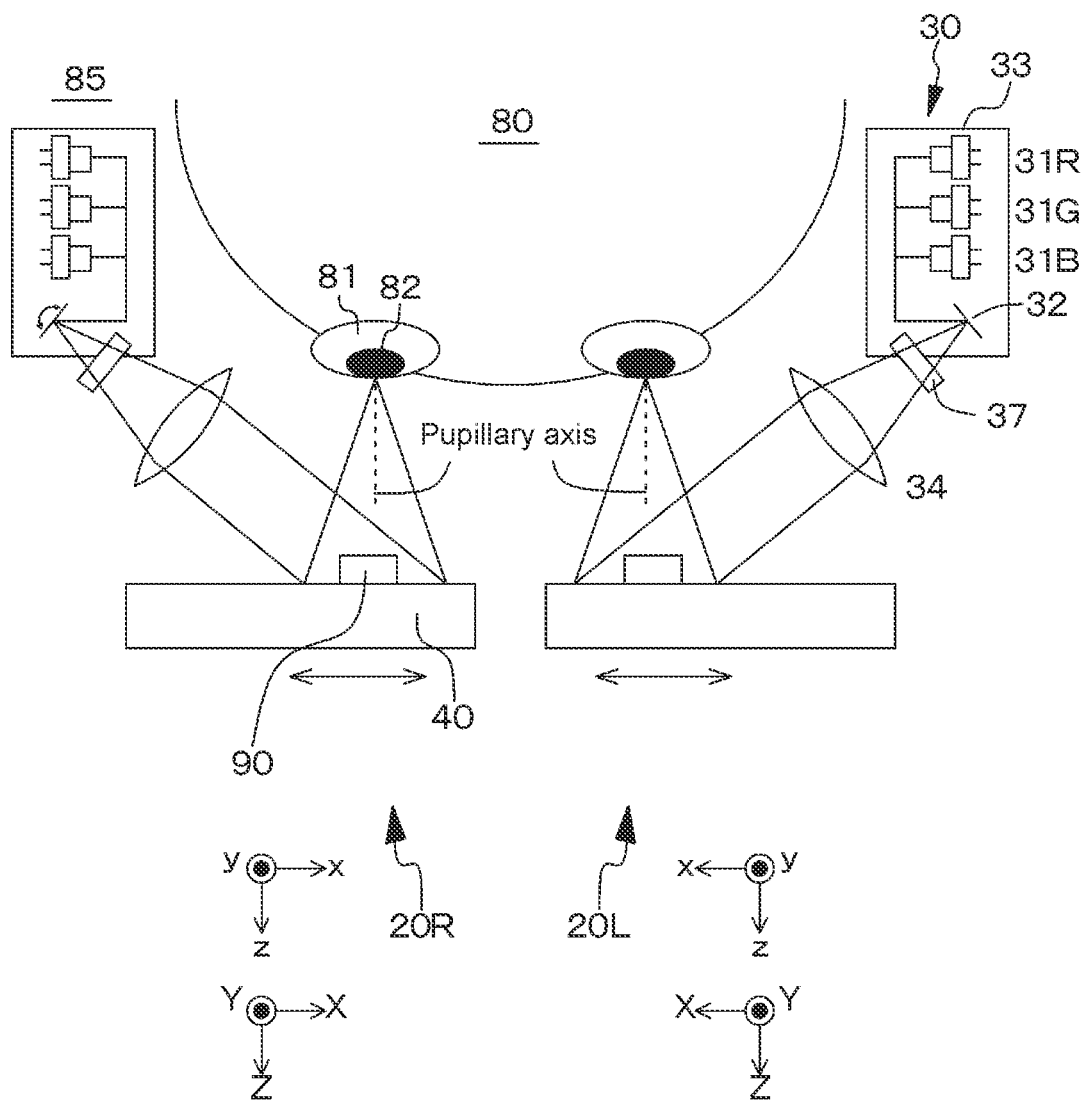
FIG. 18 is a conceptual diagram of the display apparatus of a ninth embodiment, as viewed from above the observer.

A ninth embodiment is a modification of the first to eighth embodiments. FIG. 18 is a conceptual diagram of the display apparatus of the ninth embodiment, as viewed from above the observer, and the image forming apparatus 30 includes a dispersion compensation element 37 in the ninth embodiment, as illustrated in FIG. 18. Here, the dispersion compensating element 37 is arranged between the light sources 31R, 31G, and 31B, and the scanning mechanism 32. The dispersion compensating element 37 is a type of correction lens, and is an element that corrects for a chromatic aberration that occurs in the optical element 40. Specifically, the adjustment of the beam shape (the beam diameter, the beam divergence angle) of light exiting the dispersion compensating element 37 makes it possible to correct for a chromatic aberration.

The present disclosure has been described above on the basis of the favorable embodiments. However, the present disclosure is not limited to these embodiments. The configurations and the structures of the display apparatus (the head-mounted display), the image display apparatus, and the image forming apparatus described in the embodiments are merely illustrative, and modifications may be made thereto as appropriate.

The optical element 40 may include a concave mirror, instead of a reflective hologram diffraction grating. In this case, a light reflective film off which light of a specific wavelength is reflected is formed on a light reflective surface of a transparent member (a base portion) that is included in the concave mirror, or in a flat reflecting mirror or a Fresnel reflecting mirror that will be described later. This makes it possible to see outside through the optical element. Further, the optical element may include a lens that has a positive optical power, and the flat reflecting mirror, the lens being a lens through which an image exiting the image forming apparatus 30 passes. Further, the optical element may include the Fresnel reflecting mirror. Further, the optical element may be rotated, using the movement control apparatus, according to a change in the position of the pupil 82 of the observer 80 in parallel with the vertical direction. Note that it is sufficient if the optical element 40 is horizontally moved using the movement control apparatus when there is a change in the position of the pupil 82 of the observer 80 in parallel with the horizontal direction. Further, the angle of arrangement of the optical element 40 may be changed, using the movement control apparatus, according to a change in the position of the pupil 82 of the observer 80 in parallel with the vertical direction. Note that it is sufficient if the optical element 40 is horizontally moved using the movement control apparatus when there is a change in the position of the pupil 82 of the observer 80 in parallel with the horizontal direction.

Figure 19:
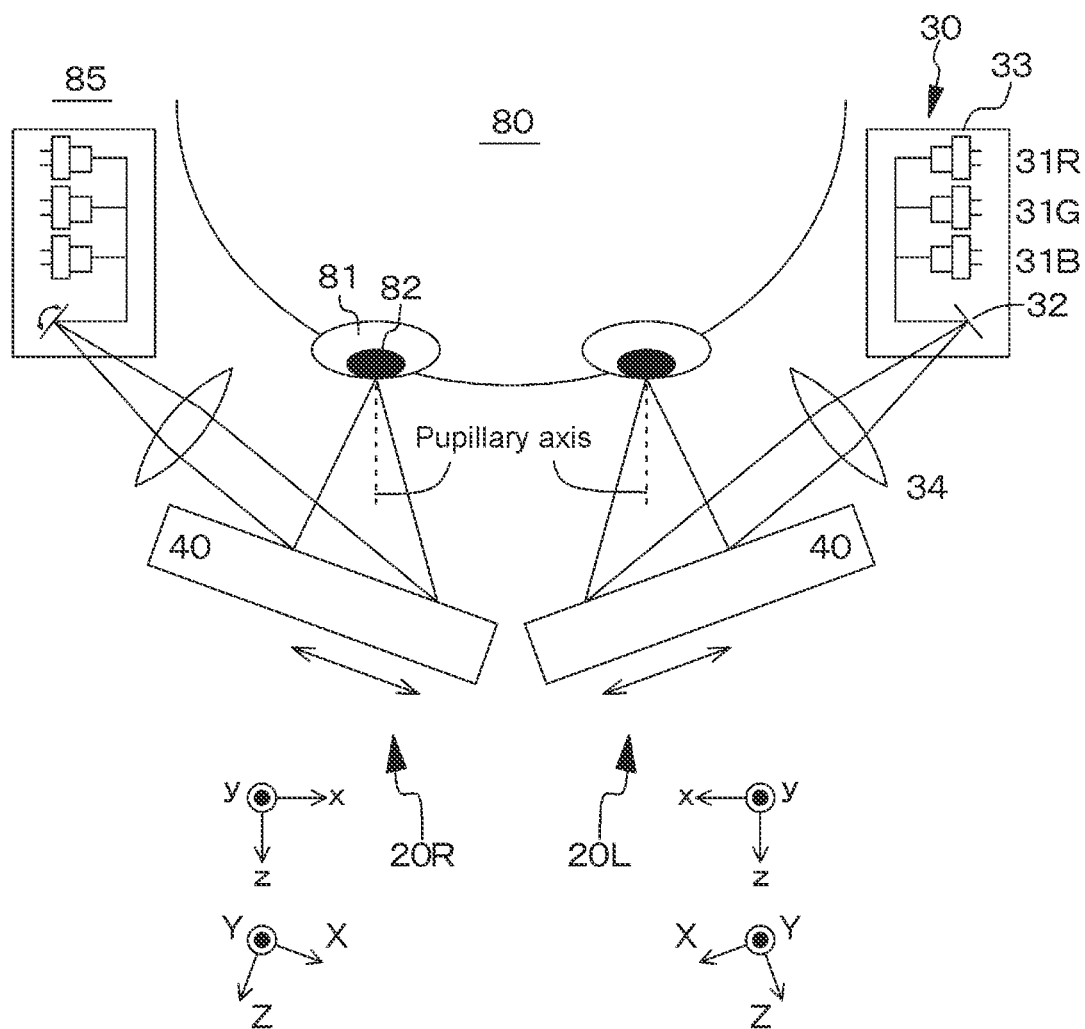
FIG. 19 is a conceptual diagram of a modification of the display apparatus of the first embodiment, as viewed from above the observer.

FIG. 19 is a conceptual diagram of a modification of the display apparatus of the first embodiment, as viewed from above the observer, and $\theta_0$ may be unequal to 0 degrees, as illustrated in FIG. 19.

Figure 20A:
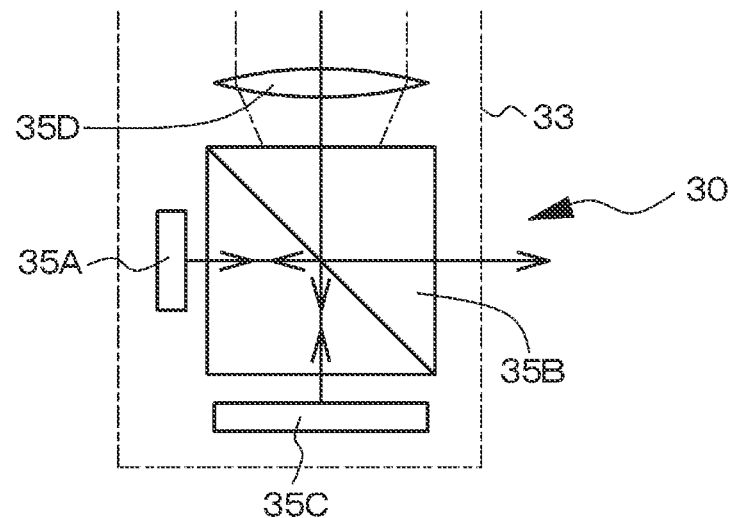
FIGS. 20A and 20B are conceptual diagrams of modifications of the image forming apparatus.

The image forming apparatus 30 may be the image forming apparatus having the first configuration. This image forming apparatus 30 in a conceptual diagram of FIG. 20A includes a plurality of pixels arranged in a two-dimensional matrix. Specifically, the entirety of the image forming apparatus 30 is accommodated in the housing 33 (indicated by a dot-dash line in FIG. 20A). The housing 33 includes an opening (not illustrated), and light exits an optical system (a parallel-light output optical system, or a collimating optical system) 35D through the opening. A reflective spatial light modulating apparatus includes a liquid crystal display apparatus (LCD) 35C of LCOS that serves as a light bulb. The reflective spatial light modulating apparatus further includes a polarization beam splitter 35B in which a portion of light from a light source 35A is reflected off the polarization beam splitter 35B to be guided to the liquid crystal display apparatus 35C, and a portion of light reflected off the liquid crystal display apparatus 35C passes through the polarization beam splitter 35B to be guided to the optical system 35D. The liquid crystal display apparatus 35C includes a plurality of (for example, 640×480) pixels (liquid crystal cells or liquid crystal display elements) arranged in a two-dimensional matrix. The polarization beam splitter 35B has a well-known configuration and structure. Unpolarized light emitted by the light source 35A impinges on the polarization beam splitter 35B. A p-polarization component passes through the polarization beam splitter 35B, and exits the system. On the other hand, an s-polarization component is reflected off the polarization beam splitter 35B, and enters the liquid crystal display apparatus 35C. Further, the s-polarization component is internally reflected off the liquid crystal display apparatus 35C, and exits the liquid crystal display apparatus 35C. Here, from among light exiting the liquid crystal display apparatus 35C, light exiting a pixel used to display "white" includes a large amount of p-polarization component, and light exiting a pixel used to display "black" includes a large amount of s-polarization component. Thus, from among light that exits the liquid crystal display apparatus 35C and impinges on the polarization beam splitter 35B, the p-polarization component passes through the polarization beam splitter 35B to be guided to the optical system 35D. On the other hand, the s-polarization component is reflected off the polarization beam splitter 35B to be returned to the light source 35A. The optical system 35D includes, for example, a convex lens, and the image forming apparatus 30 (more specifically, the liquid crystal display apparatus 35C) is arranged at a point (a position) corresponding to a focal length of the optical system 35D, in order to generate parallel light. An image exiting the image forming apparatus 30 reaches the pupil 82 of the observer 80 through the optical element 40.

Figure 20B:
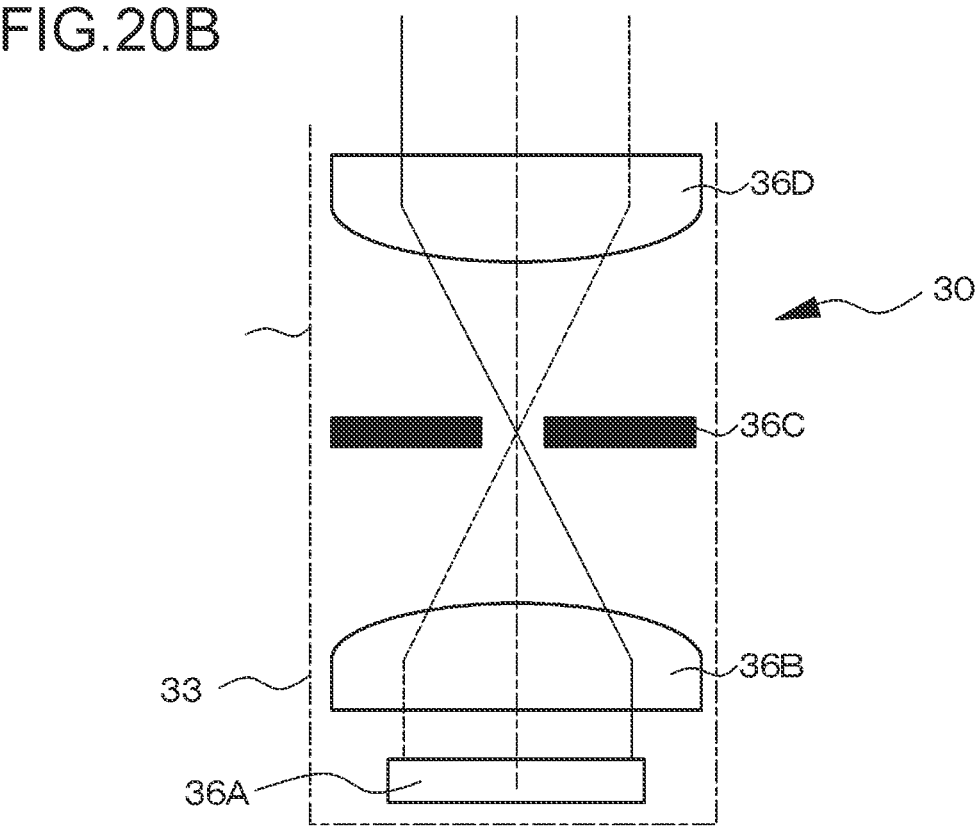

Further, FIG. 20B illustrates a conceptual diagram of the image forming apparatus 30 of the image forming apparatus having the first configuration, and the image forming apparatus 30 includes an organic EL display apparatus 36A. An image exiting the organic EL display apparatus 36A passes through a first convex lens 36B that is included in a lens system. The image further passes through a second convex lens 36D that is included in the lens system to become parallel light, and is headed for the optical element 40. A front focal position of the second convex lens 36D coincides with a back focal position of the first convex lens 36B. Further, a diaphragm 36C is arranged at the back focal position of the first convex lens 36B (the front focal position of the second convex lens 36D). The entirety of the image forming apparatus 30 is accommodated in the housing 33. The organic EL display apparatus 36A includes a plurality of (for example, 640×480) pixels (organic EL elements) arranged in a two-dimensional matrix.

Note that the present disclosure may also take the following configurations.

[A01]<<Image Display Apparatus: First Aspect>>
An image display apparatus, including:
an image forming apparatus;
an optical element that is arranged in front of a face of an observer; and
a movement control apparatus, in which
when a region situated on a side of an ear of the observer, as viewed from the optical element, is referred to as a region situated behind the optical element, the image forming apparatus is arranged in the region situated behind the optical element,
an image exiting the image forming apparatus obliquely enters the optical element from the region situated behind the optical element, and is reflected off the optical element to reach a pupil of the observer, and
when there is a change in a position of the pupil of the observer, the optical element is moved using the movement control apparatus, and a position of the image exiting the image forming apparatus is controlled using the movement control apparatus.

[A02] The image display apparatus according to [A01], in which
the optical element is moved, using the movement control apparatus, in a direction corresponding to a change in the position of the pupil of the observer in parallel with a horizontal direction.

[A03] The image display apparatus according to [A01] or [A02], in which
the image forming apparatus is moved, using the movement control apparatus, in a direction corresponding to a change in the position of the pupil of the observer in parallel with a vertical direction.

[A04] The image display apparatus according to [A03], in which
the image forming apparatus includes a 4f optical system through which the image exiting the image forming apparatus passes, and
the 4f optical system is moved, using the movement control apparatus, in the direction corresponding to the change in the position of the pupil of the observer in parallel with the vertical direction.

[A05] The image display apparatus according to [A03], in which
the image forming apparatus includes a reflecting mirror off which the image exiting the image forming apparatus is reflected, and
a light reflection angle of the reflecting mirror is changed using the movement control apparatus.

[A06] The image display apparatus according to [A01] or [A02], in which
the optical element is moved, using the movement control apparatus, in a direction corresponding to a change in the position of the pupil of the observer in parallel with a vertical direction.

[A07] The image display apparatus according to any one of [A01] to [A06], in which
the optical element includes a reflective hologram diffraction grating.

[A08] The image display apparatus according to [A07], in which
the reflective hologram diffraction grating includes a light-collecting function.

[A09] The image display apparatus according to any one of [A01] to [A06], in which
the optical element includes a concave mirror.

[A10] The image display apparatus according to any one of [A01] to [A09], in which
a pencil of light exiting the image forming apparatus enters the optical element in a telecentric state.

[A11] The image display apparatus according to any one of [A01] to [A06], in which
the optical element includes a lens that has a positive optical power, and a flat reflecting mirror, the lens being a lens through which the image exiting the image forming apparatus passes.

[A12] The image display apparatus according to [A11], in which
a pencil of light exiting the image forming apparatus enters the lens in a telecentric state.

[A13] The image display apparatus according to [A01] or [A02], in which
 the optical element is rotated, using the movement control apparatus, according to a change in the position of the pupil of the observer in parallel with a vertical direction.

[A14] The image display apparatus according to [A01] or [A02], in which
 an angle of arrangement of the optical element is changed, using the movement control apparatus, according to a change in the position of the pupil of the observer in parallel with a vertical direction.

[A15] The image display apparatus according to [A13] or [A14], in which
 according to a change in the position of the pupil of the observer in parallel with a horizontal direction, the optical element is horizontally moved using the movement control apparatus.

[A16] The image display apparatus according to any one of [A01] to [A15], in which
 the image forming apparatus includes a dispersion compensation element.

[B01] <<Image Display Apparatus: Second Aspect>>
 An image display apparatus, including:
 an image forming apparatus;
 an optical element that is arranged in front of a face of an observer; and
 a movement control apparatus, in which
 when a region situated on a side of an ear of the observer, as viewed from the optical element, is referred to as a region situated behind the optical element, the image forming apparatus is arranged in the region situated behind the optical element,
 an image exiting the image forming apparatus obliquely enters the optical element from the region situated behind the optical element, and is reflected off the optical element to reach a pupil of the observer, and
 when there is a change in a position of the pupil of the observer, the image forming apparatus is moved using the movement control apparatus.

[B02] The image display apparatus according to [B01], in which
 the optical element includes a reflective hologram diffraction grating.

[B03] The image display apparatus according to [B02], in which
 the reflective hologram diffraction grating includes a light-collecting function.

[B04] The image display apparatus according to [B01], in which
 the optical element includes a concave mirror.

[B05] The image display apparatus according to [B01], in which
 the optical element includes a lens that has a positive optical power, and a flat reflecting mirror, the lens being a lens through which the image exiting the image forming apparatus passes.

[B06] The image display apparatus according to any one of [B01] to [B05], in which
 the optical element is moved, using the movement control apparatus, in a direction corresponding to a change in the position of the pupil of the observer in parallel with a vertical direction.

[B07] The image display apparatus according to any one of [B01] to [B05], in which
 the image forming apparatus includes a reflecting mirror off which the image exiting the image forming apparatus is reflected, and
 a light reflection angle of the reflecting mirror is changed using the movement control apparatus.

[B08] The image display apparatus according to any one of [B01] to [B05], in which
 the image forming apparatus includes a 4f optical system through which the image exiting the image forming apparatus passes, and
 the 4f optical system is moved, using the movement control apparatus, in a direction corresponding to a change in the position of the pupil of the observer in parallel with a vertical direction.

[B09] The image display apparatus according to any one of [B01] to [B08], in which
 a pencil of light exiting the image forming apparatus enters the optical element in a telecentric state.

[B10] The image display apparatus according to any one of [B01] to [B09], in which
 the image forming apparatus includes a dispersion compensation element.

[C01] <<Display Apparatus>>
 A display apparatus, including:
 a frame that is worn by an observer; and
 an image display apparatus that is attached to the frame, the image display apparatus including
 an image forming apparatus,
 an optical element that is arranged in front of a face of the observer, and
 a movement control apparatus, in which
 when a region situated on a side of an ear of the observer, as viewed from the optical element, is referred to as a region situated behind the optical element, the image forming apparatus is arranged in the region situated behind the optical element,
 an image exiting the image forming apparatus obliquely enters the optical element from the region situated behind the optical element, and is reflected off the optical element to reach a pupil of the observer, and
 when there is a change in a position of the pupil of the observer, the optical element, or the image forming apparatus, or the optical element and the image forming apparatus are moved using the movement control apparatus.

[C02] The display apparatus according to [C01], including:
 the image display apparatus for a right eye; and
 the image display apparatus for a left eye.

REFERENCE SIGNS LIST 10 frame
11 front portion
11A first front portion
11B second front portion
12 temple portion
20 image display apparatus
20R image display apparatus for right eye
20L image display apparatus for left eye
30 image forming apparatus
31R, 31G, 31B light source
32 scanning mechanism
33 housing
34 light-collecting member
34A, 34B, 34C lens 35A light source
35B polarization beam splitter
35C liquid crystal display apparatus
35D collimating optical system
36A organic EL display apparatus
36B first convex lens
36C diaphragm
36D second convex lens
37 dispersion compensation element
40 optical element
41 base body
50A, 50B, 50C, 50D movement control apparatus
51, 54, 61, 64 drive apparatus
52, 55, 62, 65 slide bar
53, 56, 63, 66 attachment member
80 observer
81 eyeball of observer
82 pupil of observer
83 nose of observer
85 region situated on side of ear of observer
90 pupil position detecting mechanism
91 reflecting mirror
92 rotational axis of reflecting mirror
LC, LC', LC" image-center pencil of light
CP center of pupil of observer
O center point of optical element

The invention claimed is:

1. An image display apparatus, comprising:
an image forming apparatus;
an optical element; and
a first movement control apparatus that includes a drive apparatus, an attachment member, and a slide bar, wherein
the drive apparatus is fixed on one of an upper portion of a front portion of the image display apparatus or a lower portion of the front portion of the image display apparatus,
the optical element is connected to the first movement control apparatus through the attachment member,
the image forming apparatus is in a region behind the optical element,
the region is on a side of an ear of an observer associated with the image display apparatus,
an image that exits from the image forming apparatus obliquely enters the optical element from the region behind the optical element,
the image is reflected off the optical element to reach a pupil of the observer, and
the first movement control apparatus is configured to:
move the optical element based on a change in a position of the pupil of the observer; and
move a position of the image on the optical element based on the change in the position of the pupil of the observer.

2. The image display apparatus according to claim 1, wherein the first movement control apparatus is further configured to move the optical element in a horizontal direction based on the change in the position of the pupil of the observer in parallel with the horizontal direction.

3. The image display apparatus according to claim 1, further comprising a second movement control apparatus, wherein
the second movement control apparatus is configured to move the image forming apparatus in a vertical direction based on the change in the position of the pupil of the observer, and
the movement of the image forming apparatus is in parallel with the change in the position of the pupil of the observer in the vertical direction.

4. The image display apparatus according to claim 3, wherein
the image forming apparatus includes a 4f optical system,
the image that exits from the image forming apparatus passes through the 4f optical system,
the second movement control apparatus is further configured to move the 4f optical system in the vertical direction based on the change in the position of the pupil of the observer, and
the movement of the 4f optical system is in parallel with the change in the position of the pupil of the observer in the vertical direction.

5. The image display apparatus according to claim 3, wherein
the image forming apparatus includes a reflecting mirror configured to reflect the image that exits from the image forming apparatus, and
the second movement control apparatus is further configured to change a light reflection angle of the reflecting mirror.

6. The image display apparatus according to claim 1, wherein
the first movement control apparatus is further configured to move the optical element in a vertical direction based on the change in the position of the pupil of the observer, and
the movement of the optical element is in parallel with the change in the position of the pupil of the observer in the vertical direction.

7. The image display apparatus according to claim 1, wherein the optical element includes a reflective hologram diffraction grating.

8. The image display apparatus according to claim 7, wherein the reflective hologram diffraction grating includes a light-collecting function.

9. The image display apparatus according to claim 1, wherein the optical element includes a concave mirror.

10. The image display apparatus according to claim 1, wherein a pencil of light that exits from the image forming apparatus enters the optical element in a telecentric state.

11. The image display apparatus according to claim 1, wherein the optical element includes:
a lens that has a positive optical power, and
a flat reflecting mirror, wherein the image that exits from the image forming apparatus passes through the lens.

12. The image display apparatus according to claim 1, wherein
the first movement control apparatus is further configured to rotate the optical element based on the change in the position of the pupil of the observer, and
the rotation of the optical element is in parallel with the change in the position of the pupil of the observer in a vertical direction.

13. The image display apparatus according to claim 1, wherein
the first movement control apparatus is further configured to change an angle of an arrangement of the optical element based on the change in the position of the pupil of the observer, and
the change of angle is in parallel with the change in the position of the pupil of the observer in a vertical direction.

14. The image display apparatus according to claim 1, wherein the image forming apparatus includes a dispersion compensation element.

15. An image display apparatus, comprising:
an image forming apparatus;
an optical element; and
a movement control apparatus that includes a drive apparatus, an attachment member, and a slide bar, wherein
the drive apparatus is fixed on a side of a front portion of the image display apparatus,
the image forming apparatus is connected to the slide bar through the attachment member,
the image forming apparatus is in a region behind the optical element,
the region is on a side of an ear of an observer associated with the image display apparatus,
an image that exits from the image forming apparatus obliquely enters the optical element from the region behind the optical element,
the image is reflected off the optical element to reach a pupil of the observer,
the movement control apparatus is configured to move the image forming apparatus based on a change in a position of the pupil of the observer, and
the image forming apparatus includes a light source.

16. The image display apparatus according to claim 15, wherein the optical element includes a reflective hologram diffraction grating.

17. The image display apparatus according to claim 16, wherein the reflective hologram diffraction grating includes a light-collecting function.

18. The image display apparatus according to claim 15, wherein a pencil of light that exits from the image forming apparatus enters the optical element in a telecentric state.

19. A display apparatus, comprising:
a frame that is worn by an observer; and
a plurality of image display apparatuses that are attached to the frame, wherein each of the plurality of image display apparatuses includes:
an image forming apparatus;
an optical element;
a first movement control apparatus that includes a first drive apparatus, a first attachment member, and a first slide bar, wherein
the plurality of image display apparatuses includes an image display apparatus,
the first drive apparatus is fixed on one of an upper portion of a front portion of the image display apparatus or a lower portion of the front portion of the image display apparatus, and
the optical element is connected to the first movement control apparatus member through the attachment member; and
a second movement control apparatus that includes a second drive apparatus, a second attachment member, and a second slide bar, wherein
the second drive apparatus is fixed on a side of the front portion of the image display apparatus,
the image forming apparatus is connected to the second slide bar through an attachment member,
the image forming apparatus is in a region behind the optical element,
the region is on a side of an ear of the observer,
an image that exits from the image forming apparatus obliquely enters the optical element from the region behind the optical element,
the image is reflected off the optical element to reach a pupil of the observer,
the first movement control apparatus is configured to move the optical element based on a change in a position of the pupil of the observer; and
the second movement control apparatus is configured to move the image forming apparatus based on the change in the position of the pupil of the observer, wherein the image forming apparatus includes a light source.

20. The display apparatus according to claim 19, further comprising:
a first image display apparatus of the plurality of image display apparatuses for a right eye of the observer; and
a second image display apparatus of the plurality of image display apparatuses for a left eye of the observer.

* * * * *